US008164837B2

(12) United States Patent
Bowers et al.

(10) Patent No.: US 8,164,837 B2
(45) Date of Patent: *Apr. 24, 2012

(54) NEGATIVELY-REFRACTIVE FOCUSING AND SENSING APPARATUS, METHODS, AND SYSTEMS

(75) Inventors: Jeffrey A. Bowers, Kirkland, WA (US);
Roderick A. Hyde, Redmond, WA (US);
Edward K. Y. Jung, Bellevue, WA (US);
John Brian Pendry, Surrey (GB); David Schurig, Raleigh, NC (US); David R. Smith, Durham, NC (US); Clarence T. Tegreene, Bellevue, WA (US); Thomas A. Weaver, San Mateo, CA (US);
Charles Whitmer, North Bend, WA (US); Lowell L. Wood, Jr., Bellevue, WA (US)

(73) Assignee: The Invention Science Fund I, LLC

( * ) Notice: Subject to any disclaimer, the term of this patent is extended or adjusted under 35 U.S.C. 154(b) by 222 days.

This patent is subject to a terminal disclaimer.

(21) Appl. No.: 12/288,423

(22) Filed: Oct. 20, 2008

(65) Prior Publication Data
US 2009/0296077 A1 Dec. 3, 2009

Related U.S. Application Data

(63) Continuation-in-part of application No. 12/228,140, filed on Aug. 7, 2008, now Pat. No. 7,830,618, and a continuation-in-part of application No. 12/220,703, filed on Jul. 25, 2008, and a continuation-in-part of application No. 12/220,705, filed on Jul. 25, 2008, and a continuation-in-part of application No. 12/214,534, filed on Jun. 18, 2008, and a continuation-in-part of application No. 12/156,443, filed on May 30, 2008.

(51) Int. Cl.
*G02B 13/00* (2006.01)
(52) U.S. Cl. ........................................ 359/724; 359/721
(58) Field of Classification Search .................. 356/128;
359/721, 724, 672, 676, 642, 900; 343/909,
343/753; 385/129
See application file for complete search history.

(56) References Cited

U.S. PATENT DOCUMENTS

| 3,659,111 | A | * | 4/1972 | Weaver et al. ................. 250/565 |
| 4,105,955 | A | * | 8/1978 | Hayashi et al. ............. 372/45.01 |
| 4,143,944 | A | * | 3/1979 | Takahashi .................... 359/750 |
| 4,343,000 | A |  | 8/1982 | Macidull |
| 4,545,653 | A |  | 10/1985 | Brenden et al. |

(Continued)

FOREIGN PATENT DOCUMENTS

EP       2 019 447 A1     1/2009
(Continued)

OTHER PUBLICATIONS

PCT International Search Report; International App. No. PCT/US 09/01108; Nov. 16, 2009; pp. 1-2.

(Continued)

*Primary Examiner* — Sang Nguyen

(57) ABSTRACT

Apparatus, methods, and systems provide negatively-refractive focusing and sensing of electromagnetic energy. In some approaches the negatively-refractive focusing includes providing an interior focusing region with an axial magnification substantially less than one. In some approaches the negatively-refractive focusing includes negatively-refractive focusing with a transformation medium, where the transformation medium may include an artificially-structured material such as a metamaterial.

53 Claims, 8 Drawing Sheets

U.S. PATENT DOCUMENTS

| | | | |
|---|---|---|---|
| 4,638,322 A | | 1/1987 | Lamberty |
| 4,700,196 A | | 10/1987 | Campbell et al. |
| 4,844,617 A | | 7/1989 | Kelderman et al. |
| 4,872,743 A | * | 10/1989 | Baba et al. ............... 359/298 |
| 4,989,006 A | | 1/1991 | Roth |
| 5,013,143 A | | 5/1991 | Pasco |
| 5,121,227 A | * | 6/1992 | Fisher et al. ............... 359/1 |
| 5,161,039 A | * | 11/1992 | Schellenberg ............ 359/3 |
| 5,386,215 A | | 1/1995 | Brown |
| 5,563,739 A | * | 10/1996 | Sato ............... 359/691 |
| 5,774,249 A | | 6/1998 | Shiraishi et al. |
| 5,784,507 A | | 7/1998 | Holm-Kennedy et al. |
| 5,911,018 A | | 6/1999 | Bischel et al. |
| 5,956,447 A | | 9/1999 | Zel'Dovich et al. |
| 6,072,889 A | | 6/2000 | Deaett et al. |
| 6,078,946 A | | 6/2000 | Johnson |
| 6,117,517 A | | 9/2000 | Diaz et al. |
| 6,118,908 A | | 9/2000 | Bischel et al. |
| 6,335,835 B1 | * | 1/2002 | Koike ............... 359/717 |
| 6,337,125 B1 | | 1/2002 | Diaz et al. |
| 6,381,072 B1 | * | 4/2002 | Burger ............... 359/622 |
| 6,441,771 B1 | | 8/2002 | Victora |
| 6,456,252 B1 | | 9/2002 | Goyette |
| 6,512,483 B1 | | 1/2003 | Holden et al. |
| 6,520,643 B1 | | 2/2003 | Holman et al. |
| 6,525,875 B1 | | 2/2003 | Lauer |
| 6,597,006 B1 | | 7/2003 | McCord et al. |
| 6,690,336 B1 | | 2/2004 | Leisten et al. |
| 6,714,061 B2 | | 3/2004 | Hareland |
| 6,791,432 B2 | | 9/2004 | Smith et al. |
| 6,870,671 B2 | | 3/2005 | Travis |
| 6,965,354 B2 | * | 11/2005 | Pendry ............... 343/909 |
| 6,999,044 B2 | | 2/2006 | Durham et al. |
| 7,006,052 B2 | | 2/2006 | Delgado et al. |
| 7,218,285 B2 | | 5/2007 | Davis et al. |
| 7,265,910 B2 | * | 9/2007 | Ito et al. ............... 359/666 |
| 7,339,539 B2 | * | 3/2008 | Joannopoulos et al. ...... 343/754 |
| 7,348,930 B2 | | 3/2008 | Lastinger et al. |
| 7,352,941 B2 | | 4/2008 | Bratkovski et al. |
| 7,411,736 B2 | * | 8/2008 | Tsukagoshi ............... 359/642 |
| 7,463,433 B2 | | 12/2008 | Tang |
| 7,489,282 B2 | | 2/2009 | Lastinger et al. |
| 7,529,030 B2 | | 5/2009 | Nishioka |
| 7,535,171 B2 | | 5/2009 | Bernkopf |
| 7,535,660 B2 | | 5/2009 | Saito |
| 7,538,946 B2 | * | 5/2009 | Smith et al. ............... 359/569 |
| 7,554,741 B2 | | 6/2009 | Hamada |
| 7,643,227 B2 | * | 1/2010 | Nishioka ............... 359/793 |
| 7,675,594 B2 | | 3/2010 | Lee et al. |
| 7,729,199 B2 | | 6/2010 | O'Connell |
| 7,777,962 B2 | * | 8/2010 | Bowers et al. ............... 359/642 |
| 7,830,618 B1 | | 11/2010 | Bowers et al. |
| 7,834,980 B2 | * | 11/2010 | Baselmans et al. ............... 355/67 |
| 7,872,812 B2 | | 1/2011 | Bowers et al. |
| 2002/0149534 A1 | | 10/2002 | Bobier |
| 2003/0052102 A1 | | 3/2003 | Amako et al. |
| 2004/0066251 A1 | | 4/2004 | Eleftheriades et al. |
| 2004/0091222 A1 | | 5/2004 | Canning et al. |
| 2004/0254474 A1 | | 12/2004 | Seibel et al. |
| 2005/0099348 A1 | | 5/2005 | Pendry |
| 2005/0221128 A1 | | 10/2005 | Kochergin |
| 2005/0225492 A1 | | 10/2005 | Metz |
| 2005/0253667 A1 | | 11/2005 | Itoh et al. |
| 2006/0028374 A1 | | 2/2006 | Fullerton |
| 2006/0039072 A1 | | 2/2006 | Ruoff et al. |
| 2006/0115212 A1 | | 6/2006 | Yanik et al. |
| 2006/0121358 A1 | | 6/2006 | Rich et al. |
| 2006/0125681 A1 | | 6/2006 | Smith et al. |
| 2006/0214113 A1 | | 9/2006 | Kleinerman |
| 2007/0109023 A1 | | 5/2007 | Beausoliel et al. |
| 2007/0124122 A1 | | 5/2007 | Freier |
| 2007/0188385 A1 | | 8/2007 | Hyde et al. |
| 2007/0188397 A1 | | 8/2007 | Parsche |
| 2007/0201805 A1 | | 8/2007 | Hamada |
| 2007/0236769 A1 | | 10/2007 | Zalevsky |
| 2007/0285314 A1 | | 12/2007 | Mortazawi et al. |
| 2008/0024792 A1 | | 1/2008 | Pendry et al. |
| 2008/0052904 A1 | | 3/2008 | Schneider et al. |
| 2008/0079638 A1 | | 4/2008 | Choi et al. |
| 2008/0165442 A1 | | 7/2008 | Cai et al. |
| 2008/0258993 A1 | | 10/2008 | Gummalla et al. |
| 2009/0040132 A1 | | 2/2009 | Sridhar et al. |
| 2009/0071537 A1 | | 3/2009 | Yavuzcetin et al. |
| 2009/0076367 A1 | * | 3/2009 | Sit et al. ............... 600/398 |
| 2009/0079644 A1 | | 3/2009 | May et al. |
| 2009/0096545 A1 | | 4/2009 | O'Hara et al. |
| 2009/0116096 A1 | | 5/2009 | Zalevsky et al. |
| 2009/0135086 A1 | | 5/2009 | Fuller et al. |
| 2009/0285531 A1 | | 11/2009 | Hirose |
| 2009/0296236 A1 | | 12/2009 | Bowers et al. |
| 2010/0134898 A1 | | 6/2010 | Shalaev et al. |
| 2010/0156573 A1 | | 6/2010 | Smith et al. |
| 2010/0207012 A1 | | 8/2010 | Hyde et al. |
| 2010/0301971 A1 | | 12/2010 | Yonak et al. |
| 2010/0303123 A1 | | 12/2010 | Li |

FOREIGN PATENT DOCUMENTS

| | | |
|---|---|---|
| GB | 2 382 230 A | 5/2003 |
| JP | 2006-223193 | 8/2006 |
| JP | 2006-223193 | 2/2008 |
| WO | WO 02/049146 A3 | 6/2002 |
| WO | WO 03/088419 A1 | 10/2003 |
| WO | WO 2004/093155 A3 | 10/2004 |
| WO | WO 2006/023195 A2 | 3/2006 |
| WO | WO 2008/115881 A1 | 9/2008 |
| WO | WO 2008/137509 A1 | 11/2008 |

OTHER PUBLICATIONS

*Ariad* v. *Eli Lilly*; United States Court of Appeals for the Federal Circuit; Case No. 2008-1248; bearing a date of 2010; total of 72 pages; located at http://www.cafe.uscourts.gov/opinions/08-1248.pdf.

Cowan, Ben; "FDTD modeling of photonic crystal fibers"; EE256 Final Project; pp. 1-7.

Driscoll, T. et al.; "Free-space microwave focusing by a negative-index gradient lens"; Applied Physics Letters; bearing a published online date of Feb. 21, 2006; printed on May 14, 2010; pp. 1-4; vol. 88, Issue 8; © 2006 American Institute of Physics.

Grzegorczyk, Tomasz M. et al.; "Refraction Laws for Anisotropic Media and Their Application to Left-Handed Metamaterials"; IEEE Transactions on Microwave Theory and Techniques; bearing a date of Apr. 2005; pp. 1443-1450; vol. 55, No. 4; © 2005 IEEE.

Padilla, Willie J. et al.; "Negative refractive index metamaterials"; Materials Today; bearing a date of Jul.-Aug. 2006; pp. 28-35; vol. 9, No. 7-8; © Elsevier Ltd. 2006.

Satoh, Hiroaki et al.; "Studies on Functional Photonic Crystal Devices Utilizing Anisotropic Medium Properties by Condensed Node Spatial Network Method"; International Symposium on Communications and Information Technologies 2004 (ISCIT 2004); bearing a date of Oct. 26-29, 2004; pp. 829-834.

Yannopapas, Vassilios et al.; "Negative refractive index metamaterials from inherently non-magnetic materials for deep infrared to terahertz frequency ranges"; Journal of Physics: Condensed Matter; bearing a date of 2005; pp. 3717-3734; vol. 17; Institute of Physics Publishing.

PCT International Search Report; International App. No. PCT/US 09/03272; pp. 1-4; Sep. 21, 2009.

Sears, Francis Weston; "Refraction of a Spherical Wave at a Plane Surface"; "Optics"; bearing a 5th printing date of Apr. 1958; pp. 38-43; Addison-Wesley Publishing Company; Reading, MA.

Wang, et al.; "Nanopin Plasmonic Resonator Array and Its Optical Properties"; Nano Letters; bearing a date of 2007; pp. 1076-1080; vol. 7, No. 4; American Chemical Society.

U.S. Appl. No. 11/983,353, John Brian Pendry et al.
U.S. Appl. No. 12/069,170, John Brian Pendry et al.
U.S. Appl. No. 12/074,247, Jordin T. Kare.
U.S. Appl. No. 12/074,248, Jordin T. Kare.
U.S. Appl. No. 12/156,443, Jeffrey A. Bowers et al.
U.S. Appl. No. 12/214,534, Jeffrey A. Bowers et al.
U.S. Appl. No. 12/220,705, Jeffrey A. Bowers et al.
U.S. Appl. No. 12/221,198, Jeffrey A. Bowers et al.
U.S. Appl. No. 12/221,201, Jeffrey A. Bowers et al.

U.S. Appl. No. 12/220,703, Jeffrey A. Bowers et al.
U.S. Appl. No. 12/228,153, Jeffrey A. Bowers et al.
U.S. Appl. No. 12/231,681, Jeffrey A. Bowers et al.
U.S. Appl. No. 12/283,352, Jeffrey A. Bowers et al.
Alvey, Graham R. et al.; "Investigation Into Techniques for Packaging Cosite Microstrip Patch Antennas Into Handheld Devices"; Antenna Technology Small Antennas and Novel Metamaterials, 2006 IEEE International Workshop; Mar. 6-8, 2006; pp. 45-48.
Balanis, Constantine A.; *Antenna Theory: Analysis and Design*; 2005; 1136 pages; $3^{rd}$ Edition; ISBN 047166782X; Wiley-Interscience.
Barkovskii, L.M. et al..; "The Impedance Tensor for Electromagnetic Waves in Anisotropic Media"; Journal of Applied Spect.; 1974; pp. 836-837; 20 (6); Plenum Publishing Corporation.
Cai, Wenshan et al.; "Nonmagnetic Cloak with Minimized Scattering"; Applied Physics Letters; Published Online Sep. 11, 2007; pp. 111105-1 to 111105-3; vol. 91; American Institute of Physics.
Cai, Wenshan et al.; "Optical Cloaking with Metamaterials"; Nature Photonics; Apr. 2007; pp. 224-227; vol. 1; Nature Publishing Group.
Caloz, Christophe et al.; "*Electromagnetic Metamaterials Transmission Line Theory and Microwave Applications*"; 2006; 352 pages; ISBN 0471669857; Wiley-Interscience.
Chen, Hongsheng et al.; Metamaterial Exhibiting Left-Handed Properties Over Multiple Frequency Bands; Journal of Applied Physics; Nov. 1, 2004; pp. 5338-5340; vol. 96, No. 9; American Institute of Physics.
Cummer, Steven A. et al.; "Full-Wave Simulations of Electromagnetic Cloaking Structures"; Physical Review E; 2006; pp. 036621-1 to 036621-5; vol. 74; The American Physical Society.
Dewar, G.; "A Thin Wire Array and Magnetic Host Structure with n<0"; Journal of Applied Physics; 2005; pp. 10Q101-1 to 10Q101-3; vol. 97; American Institute of Physics.
Efimov, S.P.; "Compression of Electromagnetic Waves by Anisotropic Media ('Nonreflecting' Crystal Model)"; Radiophysics and Quantum Electronics; Sep. 1978; pp. 916-920; vol. 21, No. 9; Springer New York.
Engheta, Nader et al.; *Metamaterials Physics and Engineering Explorations*; 2006; 414 pages; ISBN 139780471761020; John Wiley & Sons, Inc.
Enoch, Stefan et al.; "A Metamaterial for Directive Emission"; Physical Review Letters; Nov. 18, 2002; pp. 213902-1 to 213902-4; vol. 89, No. 21; The American Physical Society.
Georgakopoulos, Stavros V. et al.; "Cosite Interference Between Wire Antennas on Helicopter Structures and Rotor Modulation Effects: FDTD Versus Measurements"; IEEE Transactions on Electromagnetic Compatibility; Aug. 1999; pp. 221-233; vol. 41, No. 3; IEEE.
Ghose, Rabindra N.; "Collocation of Receivers and High-Power Broadcast Transmitters"; IEEE Transactions on Broadcasting; Jun. 1988; pp. 154-158; vol. 34, No. 2; IEEE.
Hoffman, Anthony J. et al.; "Negative refraction in semiconductor metamaterials"; Nature Materials; Dec. 2007; pp. 946-950; vol. 6; Nature Publishing Group.
Holden, Anthony; "Inside the Wavelength: Electromagnetics in the Near Field"; Foresight Exploiting the Electromagnetic Spectrum State of the Science Review; pp. 1-57; located at: http://www.foresight.gov.uk/Previous_Projects/Exploiting_the_electromagnetic_spectrum/Reports_and_Publications/State_of_the_science_reviews/Inside_the_wavelength/EEMS_Inside_the_wavelength.pdf.
Jacob, Zubin et al.; "Optical Hyperlens: Far-field imaging beyond the diffraction limit"; Optics Express; Sep. 4, 2006; pp. 8247-8256; vol. 14, No. 18; OSA.
Joannopoulos, John D. et al.; "*Photonic Crystals: Molding the Flow of Light*(*Second Edition*)"; 2008; 304 pages; ISBN-10: 0691124566; Princeton University Press.
Kildishev, Alexander et al.; "Engineering space for light via transformation optics"; Optics Letters; Jan. 1, 2008; pp. 43-45; vol. 33, No. 1; Optical Society of America.
Kraus, John D.; Marhefka, Ronald J.; *Antennas For All Applications*; 2001; 960 pages; $3^{rd}$ Edition; ISBN 0072321032; McGraw-Hill Science/Engineering/Math.

Le, Anh Q. et al.; "An Evaluation of Collocation Interference Mitigation Approach for Shipboard SINCGARS Radios"; Military Communications Conference; Nov. 7, 1995; pp. 612-616; vol. 2; IEEE.
Leonhardt, Ulf; Philbin, Thomas G.; "General Relativity in Electrical Engineering"; New Journal of Physics; 2006; pp. 1-18; vol. 8, No. 247; IOP Publishing Ltd and Deutsche Physikalische Gesellschaft.
Li, Shing Ted et al.; "EMC Analysis of a Shipboard Frequency-Hopping Communication System"; Electromagnetic Compatibility 1996, Symposium Record., IEEE 1996 International Symposium; Aug. 19-23, 1996; pp. 219-224; IEEE.
Linden, Stefan et al.; "Photonic Metamaterials: Magnetism at Optical Frequencies"; IEEE Journal of Selected Topics in Quantum Electronics; Nov./Dec. 2006; pp. 1097-1105; vol. 12, No. 6; IEEE.
Luukkonen, Olli; "Antenna Performance Enhancement Using Complex Materials"; pp. 1-8; located at: http://www.tkk.fi/Yksikot/Sahkomagnetiikka/kurssit/S-96.4620_2006/reports/antenna2.pdf.
Pendry, J.B. et al.; "Controlling Electromagnetic Fields"; Science; Jun. 23, 2006; pp. 1780-1782 (8 Total Pages including Supporting Material); vol. 312; located at: www.sciencemag.org.
Pendry, J.B.; Ramakrishna, S.A.; "Focusing Light Using Negative Refraction"; J. Phys. [Condensed Matter]; 2003; pp. 6345-6364 (pp. 1-22); vol. 15.
Pendry, J.B. et al.; "Magnetism from Conductors and Enhanced Nonlinear Phenomena"; IEEE Transactions on Microwave Theory and Techniques; Nov. 1999; pp. 2075-2084; vol. 47, No. 11; IEEE.
Rahm, Marco et al.; "Optical Design of Reflectionless Complex Media by Finite Embedded Coordinate Transformations"; Physical Review Letters; Feb. 15, 2008; pp. 063903-1-063903-4; 100, 063903 (2008); The American Physical Society.
Rahmat-Samii, Yahya; "Metamaterials in Antenna Applications: Classifications, Designs and Applications"; Antenna Technology Small Antennas and Novel Metamaterials, 2006 IEEE International Workshop; Mar. 6-8, 2006; pp. 1-4; IEEE.
Rill, Michael S. et al.; "Photonic metamaterials by direct laser writing and silver chemical vapour deposition"; Nature Materials; Advance Online Publication; May 11, 2008; pp. 1-4; Nature Publishing Group.
Sacks, Zachary S. et al.; "A Perfectly Matched Anisotropic Absorber for Use as an Absorbing Boundary Condition"; IEEE Transactions on Antennas and Propagation; Dec. 1995; pp. 1460-1463; vol. 43, No. 12; IEEE.
Salandrino, Alessandro et al.; "Far-field subdiffraction optical microscopy using metamaterial crystals: Theory and simulations"; Physical Review; Aug. 15, 2006; pp. 075103-1-075103-5; 74, 075103 (2006); The American Physical Society.
Sarychev, Andrey K. et al.; *Electrodynamics of Metamaterials*; 2007; 247 pages; ISBN 139789810242459; World Scientific Publishing Co. Pte. Ltd.
Schurig, D. et al.; "Calculation of Material Properties and Ray Tracing in Transformation Media"; Optics Express; Oct. 16, 2006; pp. 9794-9804; vol. 14, No. 21; OSA.
Schurig, D. et al.; "Metamaterial Electromagnetic Cloak at Microwave Frequencies"; Science; Nov. 10, 2006; pp. 977-980 (18 Total Pages including Supporting Material); vol. 314; located at: www.sciencemag.org.
Schurig, D. et al.; "Transformation-designed optical elements"; Optics Express; Oct. 29, 2007; pp. 14772-14782; vol. 15, No. 22; OSA.
Shalaev, Vladimir M.; "Optical Negative-Index Metamaterials"; Nature Photonics; Jan. 2007; pp. 41-48; vol. 1; Nature Publishing Group.
Sievenpiper, Dan et al.; "High-Impedance Electromagnetic Surfaces with a Forbidden Frequency Band"; IEEE Transactions on Microwave Theory and Techniques; Nov. 1999; pp. 2059-2074; vol. 47, No. 11; IEEE.
Smith, D.R.; Schurig, D.; "Electromagnetic Wave Propagation in Media with Indefinite Permittivity and Permeability Tensors"; Physical Review Letters; Feb. 21, 2003; pp. 077405-1 to 077405-4; vol. 90, No. 7; The American Physical Society.
Smith, D.R. et al.; "Metamaterials and Negative Refractive Index"; Science; Aug. 6, 2004; pp. 788-792; vol. 305; located at: www.sciencemag.org.
Sohn, J.R. et al.; "Comparative Study on Various Artificial Magnetic Conductors for Low-Profile Antenna"; Progress in Electromagnetics Research; 2006; pp. 27-37; vol. 61; located at: http://ceta.mit.edu/PIER/pier61/02.0601171.SK.Tae.L.pdf.

Travis, G.W.; Lenzing, H.F.; "Shipboard HF Interference: Problems and Mitigation"; Military Communications Conference 1989, MILCOM '89, Conference Record. 'Bridging the Gap Interoperability, Survivability, Security'; Oct. 15-18, 1989; pp. 106-110; vol. 1; IEEE.

Venskauskas, Kostas et al.; "Interference Cancellation Systems for Electromagnetically Dense Platforms"; Antennas and Propagation Society International Symposium, Aug. 1999; pp. 1612-1615; vol. 3; IEEE.

Ward, A.J.; Pendry, J.B.; "Refraction and Geometry in Maxwell's Equations"; Journal of Modern Optics; 1996; pp. 773-793; vol. 43.

Yang, Fan; Rahmat-Samii, Yahya; "Microstrip Antennas Integrated with Electromagnetic Band-Gap (EBG) Structures: A Low Mutual Coupling Design for Array Applications"; IEEE Transactions on Antennas and Propagation; Oct. 2003; pp. 2936-2946; vol. 51, No. 10; IEEE.

Yang, Fan; Rahmat-Samii, Yahya; "Reflection Phase Characterizations of the EBG Ground Plane for Low Profile Wire Antenna Applications"; IEEE Transactions on Antennas and Propagation; Oct. 2003; pp. 2691-2703; vol. 51, No. 10; IEEE.

Zharov, Alexander A. et al.; "Birefringent Left-Handed Metamaterials and Perfect Lenses for Vectorial Fields"; New Journal of Physics; 2005; pp. 1-9; vol. 7; IOP Publishing Ltd. and Deutsche Physikalische Gesellschaft.

Eleftheriades, George V., et al.; Planar Negative Refractive Index Media Using Periodically L-C Loaded Transmission Lines; IEEE Transactions on Microwave Theory and Techniques; bearing a date of Dec. 12, 2002; pp. 2702-2712; vol. 50, No. 12; © 2002 IEEE.

Freire, M.J., et al.; "Three dimensional sub-diffraction imaging by a planar metamaterial lens"; Microwave Conference, 2005 European; bearing a date of Oct. 4-6, 2005; pp. 1-4; vol. 2; located at http://ieeexplore.ieee.org/search/wrapper.jsp?arnumber=1610024.

Hwang, Jiunn-Nan et al.; "Reduction of the Peak SAR in the Human Head With Metamaterials"; IEEE Transactions on Antennas and Propagation; bearing a date of Dec. 2006; pp. 3763-3770; vol. 54, No. 12; © 2006 IEEE.

Intellectual Property Office Search Report Under Section 17(6); App. No. GB0819691.7; Jun. 22, 2009; pp. 1-2 [1 of 4].

Intellectual Property Office Search Report Under Section 17(6); App. No. GB0819691.7; Jun. 22, 2009; pp. 1-2 [2 of 4].

Intellectual Property Office Search Report Under Section 17(6); App. No. GB0819691.7; Jun. 22, 2009; pp. 1-2 [3 of 4].

Intellectual Property Office Search Report Under Section 17(6); App. No. GB0819691.7; Jun. 22, 2009; pp. 1-2 [4 of 4].

Landy, N.I., et al.; "A Perfect Metamaterial Absorber"; arXiv:0803,1670v1[cond-mat.mes-hall]; bearing a date of Mar. 11, 2008; pp. 1-6; located at http://arxiv.org/PS_cache/arxiv/pdf/803/0803.1670v1.pdf.

PCT International Search Report; International App. No. PCT/US 09/03292; bearing a date of Aug. 6, 2009; pp. 1-3.

Pendry, J.B.; "Manipulating the Near Field with Metamaterials"; Optics & Photonics News; bearing a date of Sep. 2004; pp. 1-6.

Smith, D. R., et al.; "Gradient index metamaterials"; Physical Review E 71, 036609; bearing a date of 2005; pp. 1-6; © 2005 The American Physical Society.

Urban, Jeffrey J., et al.; "Synergism in binary nanocrystal superlattices leads to enhanced p-type conductivity in self-assembled PbTe/$Ag_2$Te thin films"; Nature Materials; bearing a date of Feb. 2007; pp. 115-121; vol. 6; © 2007 Nature Publishing Group.

Wiltshire, M.C.K., et al.; "Metamaterial endoscope for magnetic field transfer: near field imaging with magnetic wires"; Optics Express; bearing a date of Apr. 7, 2003; pp. 709-715; vol. 11, No. 7; © 2003 OSA.

Xu, Z. X., et al.; "Controllable Absorbing Structure of Metamaterial at Microwave"; Progress in Electromagnetics Research, PIER; bearing a date of 2007; pp. 117-125; vol. 69.

UK Intellectual Property Office Examination Report Under Section 18(3); App. No. GB0819691.7; Jun. 25, 2010; pp. 1-3.

Kshertrimayum, R.S.; "A brief intro to metamaterials"; IEEE Potentials; bearing a date of Dec. 2004-Jan. 2005; vol. 23, Issue 5; pp. 44-46; IEEE.

Kwon, Do-Noon, Werner, Douglas H.; "Restoration of antenna parameters in scattering environments using electromagnetic cloaking"; Applied Physics Letters 92; bearing a date of 2008; pp. 1-3; American Institute of Physics.

Pendry, John; "Metamaterials open new horizons in electromagnetism"; publication date unknown; Imperial College London; located at www.ecti.utoronto.ca/Assets/Events/PendryDispEng.pdf.

Vardaxoglou et al.; "Recent advances on Metamaterials with applications in terminal and high gain array and reflector antennas"; bearing a date of 2006; IEEE; pp. 423-426.

UK Intellectual Property Office; Patent Act 1977: Search Report under Sections 17; App. No. GB0819691.7; bearing a date of Jan. 16, 2009; p. 1.

U.S. Appl. No. 12/288,653, Bowers et al.
U.S. Appl. No. 12/288,625, Bowers et al.
U.S. Appl. No. 12/288,428, Bowers et al.
U.S. Appl. No. 12/286,608, Bowers et al.
U.S. Appl. No. 12/286,444, Bowers et al.
U.S. Appl. No. 12/288,387, Bowers et al.
U.S. Appl. No. 12/288,301, Bowers et al.

Holden, Anthony; "Inside the Wavelength: Electromagnetics in the Near Field"; Jan. 30, 2004; Foresight Exploiting the Electromagnetic Spectrum State of the Science Review; pp. 1-57; located at: http://www.foresight.gov.uk/Previous_Projects/Exploiting_the_electromagnetic_spectrum/Reports_and_Publications/State_of_the_science_reviews/Inside_the_wavelength/EEMS_Inside_the_wavelength.pdf.

Pendry, John; "Metamaterials open new horizons in electromagnetism"; Jun. 26, 2008; Imperial College London; located at www.ecti.utoronto.ca/Assets/Events/PendryDispEng.pdf.

European Patent Office Supplementary European Search Report; App. No. EP 09 75 8642; Feb. 28, 2011; pp. 1-5.

Padilla, Willie J. et al; "Negative refractive index metamaterials"; materialstoday; Jul.-Aug. 2006; pp. 28-35; vol. 9; No. 7-8; Elsevier Ltd.

Chinese Office Action; App. No. 200980110212.2; bearing a date of Sep. 27, 2011; pp. 1-3; no translation provided.

Alù, Andrea et al.; "Achieving transparency with plasmonic and metamaterial coatings"; Physical Review E; bearing a date of 2005; pp. 1-23; vol. 72, No. 016623; American Physical Society.

"Double Refraction and Birefringence"; CMDITRWIKI; bearing a date of Sep. 2, 2009; pp. 1-5; located at http://depts.washington.edu/cmditr/mediawiki/index.php?title+Double_Refraction_and_Birefringence.

Halim, Suria Binti; "Antenna With Metamaterial Design"; Universiti Teknologi Malaysia; bearing a date of May 2007; 88 pages; Universiti Teknologi Malaysia.

Kirchhoff, Herb; "What Are the Physical Properties of Sapphires?"; ehow.com; bearing a date of Aug. 23, 2010; pp. 1-2; located at htp://www.ehow.com/print/list_6863886_physical-properties-sapphires_html.

Pendry, J. B. et al.; "Extremely Low Frequency Plasmons in Metallic Mesostructures"; Physical Review Letters; bearing a date of Jun. 17, 1996; pp. 4773-4776; vol. 76, No. 25; The American Physical Society.

Pendry, John B. et al.; "Reversing Light With Negative Refraction"; Physics Today; bearing a date of Jun. 2004; pp. 37-43; American Institute of Physics.

Sears, Francis Weston; Optics; bearing a date of 1949; 386 pages; $3^{rd}$ Edition; ISBN-10: 0201069156; ISBN-13:978-0201069150; Addison Wesley Publishing Company.

Stickel, Micah et al.; "Volumetric negative-refractive-index metamaterials based upon the shunt-node transmission-line configuration"; Journal of Applied Physics; bearing a date of 2007; pp. 094903-1-094903-7; vol. 102; American Institute of Physics.

European Patent Office Search Report; App. No. EP 09 75 8706; Jan. 5, 2012 (received by our agent on Jan. 6, 2012); pp. 1-2.

* cited by examiner

NEGATIVELY-REFRACTIVE FOCUSING AND SENSING APPARATUS, METHODS, AND SYSTEMS

RELATED APPLICATIONS

For purposes of the USPTO extra-statutory requirements, the present application constitutes a continuation-in-part of U.S. patent application Ser. No. 12/228,140, entitled NEGATIVELY-REFRACTIVE FOCUSING AND SENSING APPARATUS, METHODS, AND SYSTEMS, naming Jeffrey A. Bowers, Roderick A. Hyde, Edward K. Y. Jung, John Brian Pendry, David Schurig, David R. Smith, Clarence T. Tegreene, Thomas A. Weaver, Charles Whitmer, and Lowell L. Wood, Jr. as inventors, filed Aug. 7, 2008, now U.S. Pat. No. 7,830,618 which is currently, or is an application of which a currently application is entitled to the benefit of the filing date.

For purposes of the USPTO extra-statutory requirements, the present application constitutes a continuation-in-part of U.S. patent application Ser. No. 12/156,443, entitled FOCUSING AND SENSING APPARATUS, METHODS, AND SYSTEMS, naming Jeffrey A. Bowers, Roderock A. Hyde, Edward K.Y. Jung, John Brain Penday, David Schurig, David R. Smith, Clarence T. Tegreene, Thomas A. Weaver, Charles Whitmer, and Lowell L. Wood, Jr. as inventors, filed May 30, 2008,which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/214,534, entitled EMITTING AND FOCUSING APPARATUS, METHODS, AND SYSTEMS, naming Jeffrey A. Bowers, Roderick A. Hyde, Edward K.Y. Jung, John Brian Pendry, David Schurig, David R. Smith, Clarence T. Tegreene, Thomas A. Weaver, Charles Whitmer, and Lowell L. Wood, Jr. as inventors, filed Jun. 18, 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/220,703, entitled EMITTING AND NEGATIVELY-REFRACTIVE FOCUSING APPARATUS, METHODS, AND SYSTEMS, naming Jeffrey A. Bowers, Roderick A. Hyde, Edward K.Y. Jung, John Brian Pendry, David Schurig, David R. Smith, Clarence T. Tegreene, Thomas A. Weaver, Charles Whitmer, and Lowell L. Wood, Jr. as inventors, filed Jul. 25, 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/220,705, entitled NEGATIVELY-REFRACTIVE FOCUSING AND SENSING APPARATUS, METHODS, AND SYSTEMS, naming Jeffrey A. Bowers, Roderick A. Hyde, Edward K.Y. Jung, John Brian Pendry, David Schurig, David R. Smith, Clarence T. Tegreene, Thomas A. Weaver, Charles Whitmer, and Lowell L. Wood, Jr. as inventors, filed Jul. 25, 2008, which is currently co-pending, or is an application of which a currently co-pending application is entitled to the benefit of the filing date.

CROSS-REFERENCE TO RELATED APPLICATIONS

The present application is related to and claims the benefit of the earliest available effective filling date(s) from the following listed application(s) (the "Related Applications") (e.g., claims earliest available priority dates for other than provisional patent applications or claims benefits under 35 USC §119 (e) for provisional patent applications, for any and all parent, grandparent, great-grandparent,etc. applications of the Related Application(s)).

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

TECHNICAL FIELD

The application discloses apparatus, methods, and systems that may relate to electromagnetic responses that include negatively-refractive focusing and sensing of electromagnetic energy.

DETAILED DESCRIPTION

Figure 1:
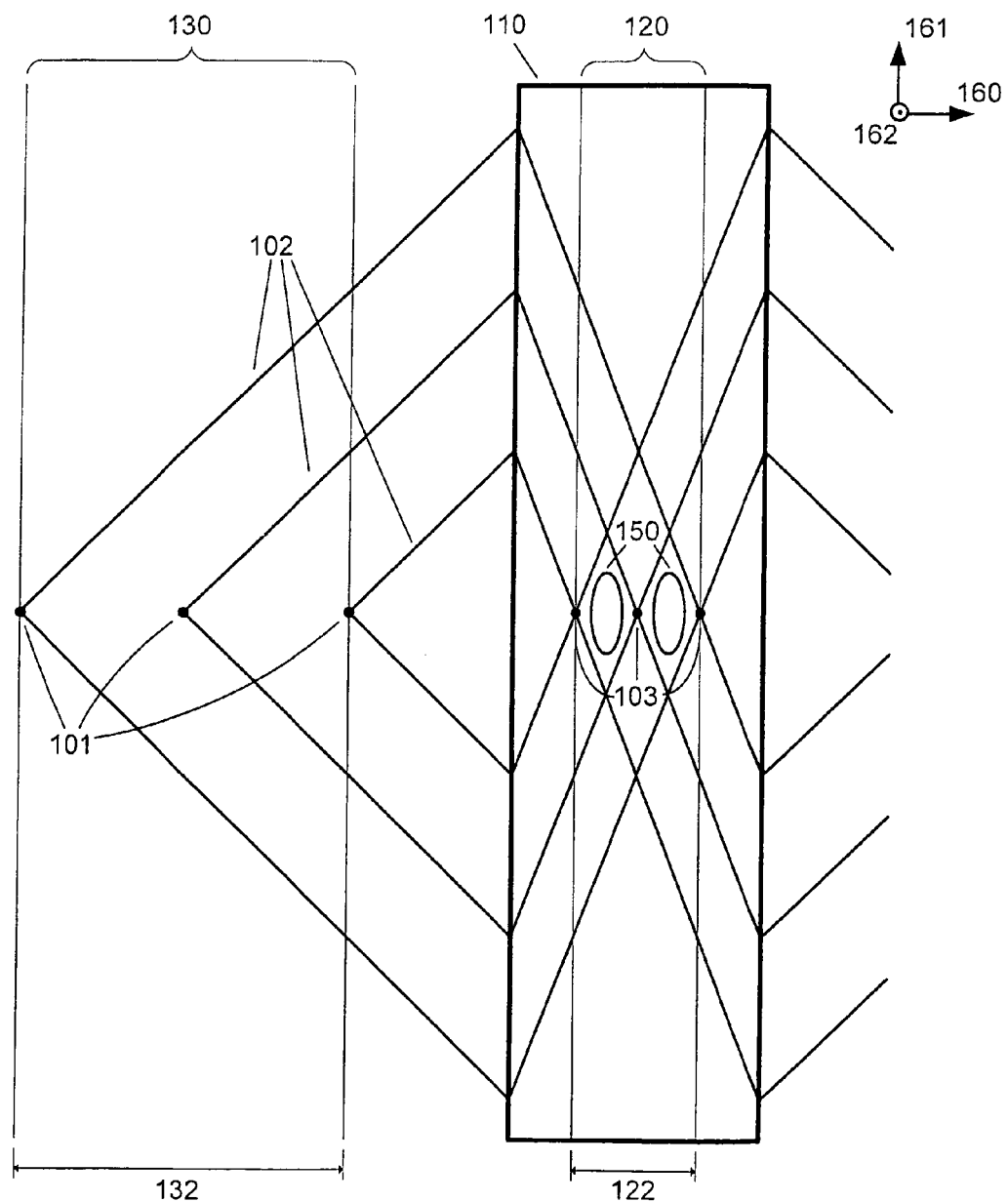
FIG. 1 depicts a first configuration of a negatively-refractive focusing structure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Transformation optics is an emerging field of electromagnetic engineering. Transformation optics devices include lenses that refract electromagnetic waves, where the refraction imitates the bending of light in a curved coordinate space (a "transformation" of a flat coordinate space), e.g. as described in A. J. Ward and J. B. Pendry, "Refraction and geometry in Maxwell's equations," J. Mod. Optics 43, 773 (1996), J. B. Pendry and S. A. Ramakrishna, "Focusing light using negative refraction," J. Phys. [Cond. Matt.] 15, 6345 (2003), D. Schurig et al, "Calculation of material properties and ray tracing in transformation media," Optics Express 14, 9794 (2006) ("D. Schurig et al (1)"), and in U. Leonhardt and T. G. Philbin, "General relativity in electrical engineering," New J. Phys. 8, 247 (2006), each of which is herein incorporated by reference. The use of the term "optics" does not imply any limitation with regards to wavelength; a transformation optics device may be operable in wavelength bands that range from radio wavelengths to visible wavelengths.

A first exemplary transformation optics device is the electromagnetic cloak that was described, simulated, and implemented, respectively, in J. B. Pendry et al, "Controlling electromagnetic waves," Science 312, 1780 (2006); S. A. Cummer et al, "Full-wave simulations of electromagnetic cloaking structures," Phys. Rev. E 74, 036621 (2006); and D. Schurig et al, "Metamaterial electromagnetic cloak at microwave frequencies," Science 314, 977 (2006) ("D. Schurig et al (2)"); each of which is herein incorporated by reference. See also J. Pendry et al, "Electromagnetic cloaking method," U.S. patent application Ser. No. 11/459,728, herein incorporated by reference. For the electromagnetic cloak, the curved coordinate space is a transformation of a flat space that has been punctured and stretched to create a hole (the cloaked region), and this transformation corresponds to a set of constitutive parameters (electric permittivity and magnetic permeability) for a transformation medium wherein electromagnetic waves are refracted around the hole in imitation of the curved coordinate space.

A second exemplary transformation optics device is illustrated by embodiments of the electromagnetic compression structure described in J. B. Pendry, D. Schurig, and D. R. Smith, "Electromagnetic compression apparatus, methods, and systems," U.S. patent application Ser. No. 11/982,353; and in J. B. Pendry, D. Schurig, and D. R. Smith, "Electromagnetic compression apparatus, methods, and systems," U.S. patent application Ser. No. 12/069,170; each of which is herein incorporated by reference. In embodiments described therein, an electromagnetic compression structure includes a transformation medium with constitutive parameters corresponding to a coordinate transformation that compresses a region of space intermediate first and second spatial locations, the effective spatial compression being applied along an axis joining the first and second spatial locations. The electromagnetic compression structure thereby provides an effective electromagnetic distance between the first and second spatial locations greater than a physical distance between the first and second spatial locations.

A third exemplary transform optics device is illustrated by embodiments of the electromagnetic cloaking and/or translation structure described in J. T. Kare, "Electromagnetic cloaking apparatus, methods, and systems," U.S. patent application Ser. No. 12/074,247; and in J. T. Kare, "Electromagnetic cloaking apparatus, methods, and systems," U.S. patent application Ser. No. 12/074,248; each of which is herein incorporated by reference. In embodiments described therein, an electromagnetic translation structure includes a transformation medium that provides an apparent location of an electromagnetic transducer different then an actual location of the electromagnetic transducer, where the transformation medium has constitutive parameters corresponding to a coordinate transformation that maps the actual location to the apparent location. Alternatively or additionally, embodiments include an electromagnetic cloaking structure operable to divert electromagnetic radiation around an obstruction in a field of regard of the transducer (and the obstruction can be another transducer).

Additional exemplary transformation optics devices are described in D. Schurig et al, "Transformation-designed optical elements," Opt. Exp. 15, 14772 (2007); M. Rahm et al, "Optical design of reflectionless complex media by finite embedded coordinate transformations," Phys. Rev. Lett. 100, 063903 (2008); and A. Kildishev and V. Shalaev, "Engineering space for light via transformation optics," Opt. Lett. 33, 43 (2008); each of which is herein incorporated by reference.

In general, for a selected coordinate transformation, a transformation medium can be identified wherein electromagnetic waves refract as if propagating in a curved coordinate space corresponding to the selected coordinate transformation. Constitutive parameters of the transformation medium can be obtained from the equations:

$$\tilde{\epsilon}^{i'j'} = |\det(\Lambda)|^{-1} \Lambda_i^{i'} \Lambda_j^{j'} \epsilon^{ij} \tag{1}$$

$$\tilde{\mu}^{i'j'} = |\det(\Lambda)|^{-1} \Lambda_i^{i'} \Lambda_j^{j'} \mu^{ij} \tag{2}$$

where $\tilde{\epsilon}$ and $\tilde{\mu}$ are the permittivity and permeability tensors of the transformation medium, $\epsilon$ and $\mu$ are the permittivity and permeability tensors of the original medium in the untransformed coordinate space, and $$\Lambda_i^{i'} = \frac{\partial x^{i'}}{\partial x^i} \tag{3}$$

is the Jacobian matrix corresponding to the coordinate transformation. In some applications, the coordinate transformation is a one-to-one mapping of locations in the untransformed coordinate space to locations in the transformed coordinate space, and in other applications the coordinate transformation is a one-to-many mapping of locations in the untransformed coordinate space to locations in the transformed coordinate space. Some coordinate transformations, such as one-to-many mappings, may correspond to a transformation medium having a negative index of refraction. In some applications, only selected matrix elements of the permittivity and permeability tensors need satisfy equations (1) and (2), e.g. where the transformation optics response is for a selected polarization only. In other applications, a first set of permittivity and permeability matrix elements satisfy equations (1) and (2) with a first Jacobian $\Lambda$, corresponding to a first transformation optics response for a first polarization of electromagnetic waves, and a second set of permittivity and permeability matrix elements, orthogonal (or otherwise complementary) to the first set of matrix elements, satisfy equations (1) and (2) with a second Jacobian $\Lambda'$, corresponding to a second transformation optics response for a second polarization of electromagnetic waves. In yet other applications, reduced parameters are used that may not satisfy equations (1) and (2), but preserve products of selected elements in (1) and selected elements in (2), thus preserving dispersion relations inside the transformation medium (see, for example, D. Schurig et al (2), supra, and W. Cai et al, "Optical cloaking with metamaterials," *Nature Photonics* 1, 224 (2007), herein incorporated by reference). Reduced parameters can be used, for example, to substitute a magnetic response for an electric response, or vice versa. While reduced parameters preserve dispersion relations inside the transformation medium (so that the ray or wave trajectories inside the transformation medium are unchanged from those of equations (1) and (2)), they may not preserve impedance characteristics of the transformation medium, so that rays or waves incident upon a boundary or interface of the transformation medium may sustain reflections (whereas in general a transformation medium according to equations (1) and (2) is substantially nonreflective). The reflective or scattering characteristics of a transformation medium with reduced parameters can be substantially reduced or eliminated by a suitable choice of coordinate transformation, e.g. by selecting a coordinate transformation for which the corresponding Jacobian $\Lambda$ (or a subset of elements thereof) is continuous or substantially continuous at a boundary or interface of the transformation medium (see, for example, W. Cai et al, "Nonmagnetic cloak with minimized scattering," *Appl. Phys. Lett.* 91, 111105 (2007), herein incorporated by reference).

In general, constitutive parameters (such as permittivity and permeability) of a medium responsive to an electromagnetic wave can vary with respect to a frequency of the electromagnetic wave (or equivalently, with respect to a wavelength of the electromagnetic wave in vacuum or in a reference medium). Thus, a medium can have constitutive parameters $\epsilon_1$, $\mu_1$, etc. at a first frequency, and constitutive parameters $\epsilon_2$, $\mu_2$, etc. at a second frequency; and so on for a plurality of constitutive parameters at a plurality of frequencies. In the context of a transformation medium, constitutive parameters at a first frequency can provide a first response to electromagnetic waves at the first frequency, corresponding to a first selected coordinate transformation, and constitutive parameters at a second frequency can provide a second response to electromagnetic waves at the second frequency, corresponding to a second selected coordinate transformation; and so on: a plurality of constitutive parameters at a plurality of frequencies can provide a plurality of responses to electromagnetic waves corresponding to a plurality of coordinate transformations. In some embodiments the first response at the first frequency is substantially nonzero (i.e. one or both of $\epsilon_1$ and $\mu_1$ is substantially non-unity), corresponding to a nontrivial coordinate transformation, and a second response at a second frequency is substantially zero (i.e. $\epsilon_2$ and $\mu_2$ are substantially unity), corresponding to a trivial coordinate transformation (i.e. a coordinate transformation that leaves the coordinates unchanged); thus, electromagnetic waves at the first frequency are refracted (substantially according to the nontrivial coordinate transformation), and electromagnetic waves at the second frequency are substantially nonrefracted. Constitutive parameters of a medium can also change with time (e.g. in response to an external input or control signal), so that the response to an electromagnetic wave can vary with respect to frequency and/or time. Some embodiments may exploit this variation with frequency and/or time to provide respective frequency and/or time multiplexing/demultiplexing of electromagnetic waves. Thus, for example, a transformation medium can have a first response at a frequency at time $t_1$, corresponding to a first selected coordinate transformation, and a second response at the same frequency at time $t_2$, corresponding to a second selected coordinate transformation. As another example, a transformation medium can have a response at a first frequency at time $t_1$, corresponding to a selected coordinate transformation, and substantially the same response at a second frequency at time $t_2$. In yet another example, a transformation medium can have, at time $t_1$, a first response at a first frequency and a second response at a second frequency, whereas at time $t_2$, the responses are switched, i.e., the second response (or a substantial equivalent thereof) is at the first frequency and the first response (or a substantial equivalent thereof) is at the second frequency. The second response can be a zero or substantially zero response. Other embodiments that utilize frequency and/or time dependence of the transformation medium will be apparent to one of skill in the art.

Constitutive parameters such as those of equations (1) and (2) (or reduced parameters derived therefrom) can be realized using artificially-structured materials. Generally speaking, the electromagnetic properties of artificially-structured materials derive from their structural configurations, rather than or in addition to their material composition.

In some embodiments, the artificially-structured materials are photonic crystals. Some exemplary photonic crystals are described in J. D. Joannopoulos et al, *Photonic Crystals: Molding the Flow of Light*, $2^{nd}$ Edition, Princeton Univ. Press, 2008, herein incorporated by reference. In photonic crystals, photonic dispersion relations and/or photonic band gaps are engineered by imposing a spatially-varying pattern on an electromagnetic material (e.g. a conducting, magnetic, or dielectric material) or a combination of electromagnetic materials. The photonic dispersion relations translate to effective constitutive parameters (e.g. permittivity, permeability, index of refraction) for the photonic crystal. The spatially-varying pattern is typically periodic, quasi-periodic, or colloidal periodic, with a length scale comparable to an operating wavelength of the photonic crystal.

In other embodiments, the artificially-structured materials are metamaterials. Some exemplary metamaterials are described in R. A. Hyde et al, "Variable metamaterial apparatus," U.S. patent application Ser. No. 11/355,493; D. Smith et al, "Metamaterials," International Application No. PCT/US2005/026052; D. Smith et al, "Metamaterials and negative refractive index," *Science* 305, 788 (2004); D. Smith et al, "Indefinite materials," U.S. patent application Ser. No. 10/525,191; C. Caloz and T. Itoh, *Electromagnetic Metamaterials: Transmission Line Theory and Microwave Applications*, Wiley-Interscience, 2006; N. Engheta and R. W. Ziolkowski, eds., *Metamaterials: Physics and Engineering Explorations*, Wiley-Interscience, 2006; and A. K. Sarychev and V. M. Shalaev, *Electrodynamics of Metamaterials*, World Scientific, 2007; each of which is herein incorporated by reference.

Metamaterials generally feature subwavelength elements, i.e. structural elements with portions having electromagnetic length scales smaller than an operating wavelength of the metamaterial, and the subwavelength elements have a collective response to electromagnetic radiation that corresponds to an effective continuous medium response, characterized by an effective permittivity, an effective permeability, an effective magnetoelectric coefficient, or any combination thereof. For example, the electromagnetic radiation may induce charges and/or currents in the subwavelength elements, whereby the subwavelength elements acquire nonzero electric and/or magnetic dipole moments. Where the electric component of the electromagnetic radiation induces electric dipole moments, the metamaterial has an effective permittivity; where the magnetic component of the electromagnetic radiation induces magnetic dipole moments, the metamaterial has an effective permeability; and where the electric (magnetic) component induces magnetic (electric) dipole moments (as in a chiral metamaterial), the metamaterial has an effective magnetoelectric coefficient. Some metamaterials provide an artificial magnetic response; for example, split-ring resonators (SRRs)—or other LC or plasmonic resonators—built from nonmagnetic conductors can exhibit an effective magnetic permeability (c.f. J. B. Pendry et al, "Magnetism from conductors and enhanced nonlinear phenomena," IEEE Trans. Micro. Theo. Tech. 47, 2075 (1999), herein incorporated by reference). Some metamaterials have "hybrid"electromagnetic properties that emerge partially from structural characteristics of the metamaterial, and partially from intrinsic properties of the constituent materials. For example, G. Dewar, "A thin wire array and magnetic host structure with n<0," J. Appl. Phys. 97, 10Q101 (2005), herein incorporated by reference, describes a metamaterial consisting of a wire array (exhibiting a negative permeability as a consequence of its structure) embedded in a nonconducting ferrimagnetic host medium (exhibiting an intrinsic negative permeability). Metamaterials can be designed and fabricated to exhibit selected permittivities, permeabilities, and/or magnetoelectric coefficients that depend upon material properties of the constituent materials as well as shapes, chiralities, configurations, positions, orientations, and couplings between the subwavelength elements. The selected permittivites, permeabilities, and/or magnetoelectric coefficients can be positive or negative, complex (having loss or gain), anisotropic, variable in space (as in a gradient index lens), variable in time (e.g. in response to an external or feedback signal), variable in frequency (e.g. in the vicinity of a resonant frequency of the metamaterial), or any combination thereof. The selected electromagnetic properties can be provided at wavelengths that range from radio wavelengths to infrared/visible wavelengths; the latter wavelengths are attainable, e.g., with nanostructured materials such as nanorod pairs or nano-fishnet structures (c.f. S. Linden et al, "Photonic metamaterials: Magnetism at optical frequencies," IEEE J. Select. Top. Quant. Elect. 12, 1097 (2006) and V. Shalaev, "Optical negative-index metamaterials," Nature Photonics 1, 41 (2007), both herein incorporated by reference). An example of a three-dimensional metamaterial at optical frequencies, an elongated-split-ring "woodpile" structure, is described in M. S. Rill et al, "Photonic metamaterials by direct laser writing and silver chemical vapour deposition," Nature Materials advance online publication, May 11, 2008, (doi:10.1038/nmat2197).

While many exemplary metamaterials are described as including discrete elements, some implementations of metamaterials may include non-discrete elements or structures. For example, a metamaterial may include elements comprised of sub-elements, where the sub-elements are discrete structures (such as split-ring resonators, etc.), or the metamaterial may include elements that are inclusions, exclusions, layers, or other variations along some continuous structure (e.g. etchings on a substrate). Some examples of layered metamaterials include: a structure consisting of alternating doped/intrinsic semiconductor layers (cf. A. J. Hoffman, "Negative refraction in semiconductor metamaterials," Nature Materials 6, 946 (2007), herein incorporated by reference), and a structure consisting of alternating metal/dielectric layers (cf. A. Salandrino and N. Engheta, "Far-field subdiffraction optical microscopy using metamaterial crystals: Theory and simulations," Phys. Rev. B 74, 075103 (2006); and Z. Jacob et al, "Optical hyperlens: Far-field imaging beyond the diffraction limit," Opt. Exp. 14, 8247 (2006); each of which is herein incorporated by reference). The metamaterial may include extended structures having distributed electromagnetic responses (such as distributed inductive responses, distributed capacitive responses, and distributed inductive-capacitive responses). Examples include structures consisting of loaded and/or interconnected transmission lines (such as microstrips and striplines), artificial ground plane structures (such as artificial perfect magnetic conductor (PMC) surfaces and electromagnetic band gap (EGB) surfaces), and interconnected/extended nanostructures (nano-fishnets, elongated SRR woodpiles, etc.).

With reference now to FIG. 1, an illustrative embodiment is depicted that includes a negatively-refractive focusing structure 110. This and other drawings, unless context dictates otherwise, can represent a planar view of a three-dimensional embodiment, or a two-dimensional embodiment (e.g. in FIG. 1 where the structures are positioned inside a metallic or dielectric slab waveguide oriented normal to the page). The negatively-refractive focusing structure receives and negatively refracts electromagnetic energy, depicted as solid rays 102 (the use of a ray description, in FIG. 1 and elsewhere, is a heuristic convenience for purposes of visual illustration, and is not intended to connote any limitations or assumptions of geometrical optics; further, the elements depicted in FIG. 1 can have spatial dimensions that are variously less than, greater than, or comparable to a wavelength of interest). The negatively-refracted electromagnetic energy converges towards an interior focusing region 120 positioned inside the negatively-refractive focusing structure 110; in this example, the interior focusing region 120 is depicted as a slab having a thickness equal an axial extent 122 of the interior focusing region. The axial extent 122 corresponds to an axial direction indicated by the axial unit vector 160, with transverse unit vectors 161 and 162 defined perpendicular thereto. In FIG. 1, the electromagnetic energy radiates from exemplary electromagnetic sources 101 in an exterior field region 130, the exterior field region being positioned outside the negatively-refractive focusing structure. In this example, the exterior field region 130 is depicted as a slab having a thickness equal to an axial extent 132 of the exterior field region. The electromagnetic sources 101 in the exterior field region correspond to electromagnetic images 103 in the interior focusing region. The axial extent 132 of the exterior field region (spanned, in this example, by the electromagnetic sources 101) exceeds the axial extent 122 of the interior-focusing region (spanned, in this example, by the electromagnetic images 103), thus demonstrating that the negatively-refractive focusing structure provides an axial magnification less than one, and in this example the axial magnification corresponds to a ratio of the axial extent of the interior focusing region to the axial extent of the exterior field region. Embodiments optionally include one or more electromagnetic sensors (schematically depicted as ellipses 150) positioned within the interior focusing region (in the presented illustrative representation, sensors are linearly positioned along the axial extent 122 of the interior focusing region, but this is not intended to be limiting).

In general, embodiments provide a negatively-refractive focusing structure having an interior focusing region and an exterior field region; electromagnetic energy that radiates from the exterior field region, and couples to the negatively-refractive focusing structure, is subsequently substantially concentrated in the interior focusing region. For example, in some applications each object point in the exterior field region defines a point spread function and a corresponding enclosed energy region (e.g. a region wherein some selected fraction—such as 50%, 75%, or 90%—of electromagnetic energy that radiates from the object point is concentrated), and the interior focusing region is a union of the enclosed energy regions for the object points that compose the exterior field region. The negatively-refractive focusing structure provides an axial magnification, and in some applications the axial magnification corresponds to a ratio where the divisor is an axial separation between first and second object points and the dividend is an axial separation between centroids of first and second point spread functions corresponding to the first and second object points. In some embodiments, the interior focusing region may be a planar or substantially planar slab (e.g. 120 in FIG. 1) having a slab thickness providing the axial extent of the interior focusing region (e.g. 122 in FIG. 1). In other embodiments, the interior focusing region may be a non-planar slab-like region, e.g. a cylindrically-, spherically-, ellipsoidally-, or otherwise-curved slab having a slab thickness providing the axial extent of the interior focusing region. In other embodiments, the interior focusing region may be neither planar nor slab-like. In some embodiments the negatively-refractive focusing structure defines an optical axis as a symmetry or central axis of the negatively-refractive focusing structure, and the optical axis provides an axial direction, with transverse directions defined perpendicular thereto. More generally, one may define an axial direction corresponding to an axial extent of the interior focusing region, with transverse directions defined perpendicular thereto. This is consistent with FIG. 1, where the interior focusing region is a planar slab, and the axial direction corresponds to a unit vector normal to the slab. Where the interior focusing region is curved, the axial direction can vary along the transverse extent of the focusing region. For example, where the interior focusing region is a cylindrically- or spherically-curved slab, the axial direction corresponds to a radius unit vector (and the transverse directions correspond to height/azimuth unit vectors or azimuth/zenith unit vectors, respectively); where the interior focusing region is an otherwise-curved slab, the axial direction corresponds to a vector locally normal to the slab surface (and the transverse directions correspond to orthogonal unit vectors locally tangent to the slab surface).

Figure 2:
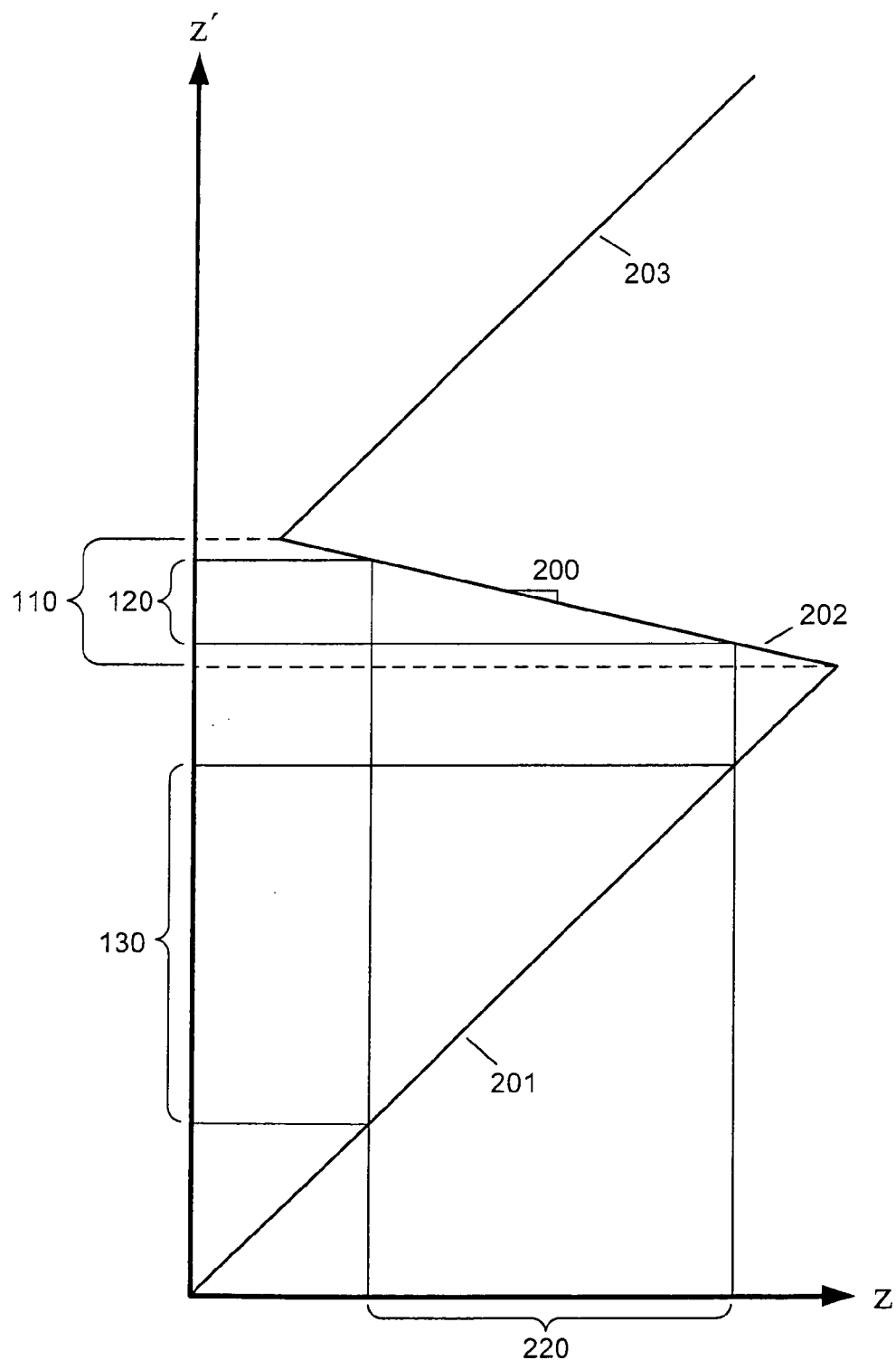
FIG. 2 depicts a first coordinate transformation.

In some embodiments a negatively-refractive focusing structure, such as that depicted in FIG. 1, includes a transformation medium. For example, the ray trajectories 102 in FIG. 1 correspond to a coordinate transformation that is multiple-valued and includes both a coordinate inversion and a uniform spatial contraction along the axial direction 160 (within the axial extent of the negatively-refractive focusing structure 110); this coordinate transformation can be used to identify constitutive parameters for a corresponding transformation medium (e.g. as provided in equations (1) and (2), or reduced parameters obtained therefrom) that responds to electromagnetic radiation as in FIG. 1. Explicitly, for the example of FIG. 1, defining z as an untransformed axial coordinate and z' as a transformed axial coordinate (where the axial coordinates are measured along the axial direction 160), the multiple-valued coordinate transformation is depicted in FIG. 2, with first, second, and third branches 201, 202, and 203 corresponding to functions $z'=f_1(z)$, $z'=f_2(z)$, and $z'=f_3(z)$, respectively. The first branch 201 is an identity transformation ($f_1(z)=z$) and maps an untransformed coordinate region 220 to the exterior field region 130. The second branch 202 includes an axial coordinate inversion and a uniform axial coordinate contraction, and maps the untransformed coordinate region 220 to the interior focusing region 120. The third branch 203 is a shifted itentity transformation ($f_3(z)=z+C$, where C is a constant). The figure also indicates the axial extent of the negatively-refractive focusing structure 110 on the z'-axis (coinciding, in this example, with the range of the second branch 202). On the second branch, defining a scale factor $$s = \frac{dz'}{dz} = f_2'(z), \quad (4)$$

the example of FIGS. 1-2 presents a constant negative scale factor $-1<s<0$ within the negatively-refractive focusing structure 110, corresponding to a coordinate inversion (whereby s<0) and a uniform spatial contraction (whereby $|s|<1$; in some instances within this document, as shall be apparent to one of skill in the art, the use of the term "scale factor," when used in the context of a spatial contraction, may refer to the absolute value of a negative scale factor such as described here). Supposing that the negatively-refractive focusing structure is surrounded by an ambient isotropic medium with constitutive parameters $\epsilon^{ij}=\epsilon\delta^{ij}$, $\mu^{ij}=\mu\delta^{ij}$ (where $\delta^{ij}$ denotes the Kronecker delta-function, with $\delta^{ij}=1$ for i=j and $\delta^{ij}=0$ for i≠j), the constitutive parameters of the transformation medium are obtained from equations (1) and (2) and are given by (in a basis with unit vectors 161, 162, and 160, respectively, in FIG. 1)

$$\tilde{\epsilon} = \begin{pmatrix} s^{-1} & 0 & 0 \\ 0 & s^{-1} & 0 \\ 0 & 0 & s \end{pmatrix}\epsilon, \tilde{\mu} = \begin{pmatrix} s^{-1} & 0 & 0 \\ 0 & s^{-1} & 0 \\ 0 & 0 & s \end{pmatrix}\mu. \quad (5)$$

Thus, the uniform spatial dilation of FIGS. 1-2 corresponds to a transformation medium that is a uniform uniaxial medium. Moreover, the scale factor is negative, so that the constitutive parameters in equation (5) are negative, and the transformation medium is a negatively-refractive medium defining a negative index of refraction.

Figure 3:
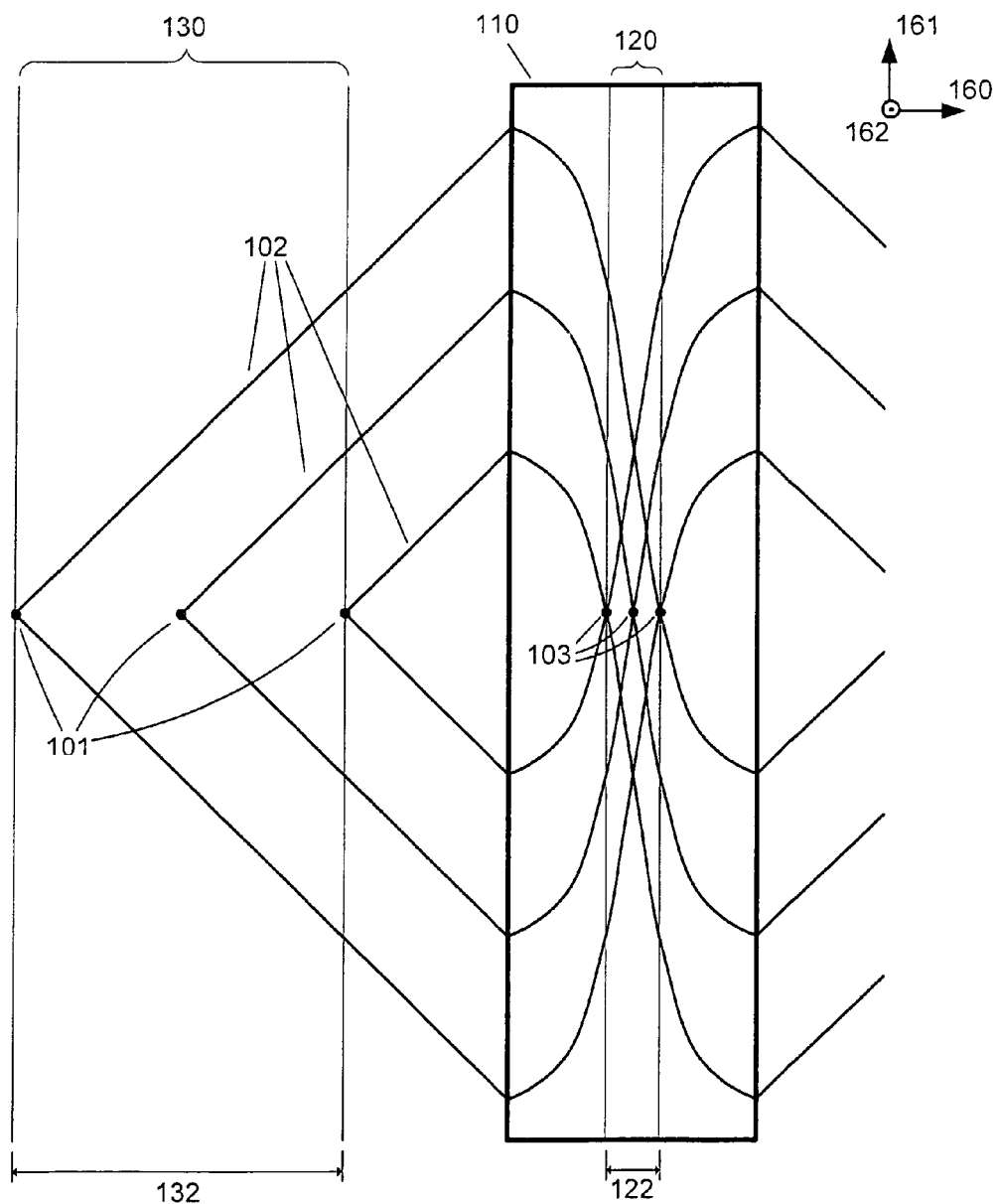
FIG. 3 depicts a second configuration of a negatively-refractive focusing structure.
Figure 4:
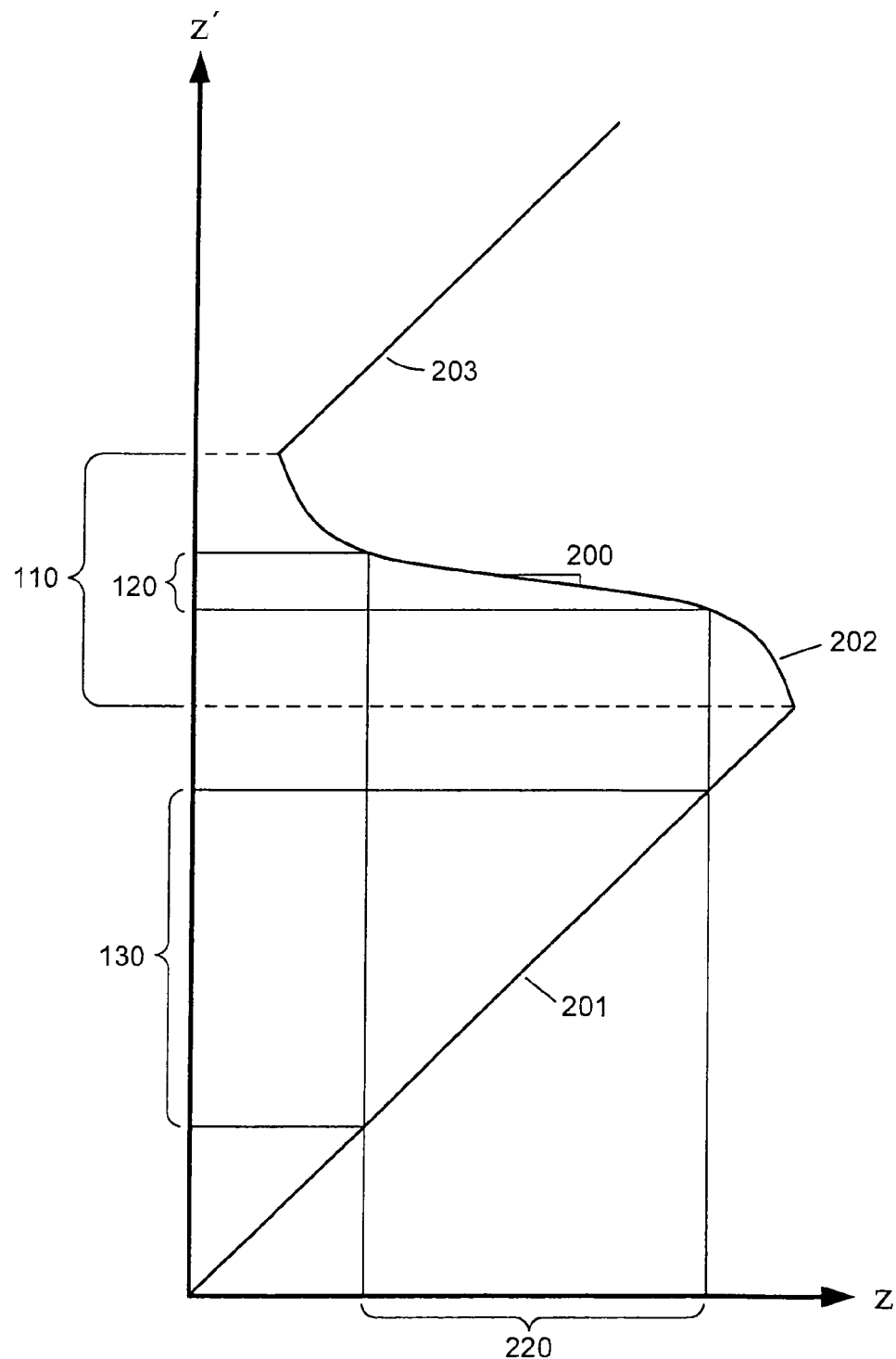
FIG. 4 depicts a second coordinate transformation.

In some embodiments, the negatively-refractive focusing structure includes a transformation medium that provides a non-uniform spatial dilation. An example is depicted in FIG. 3 and the corresponding multiple-valued coordinate transformation is depicted in FIG. 4. In FIG. 3, as in FIG. 1, a negatively-refractive focusing structure 110 provides an interior focusing region 120 for electromagnetic energy that radiates from an exterior field region 130. In contrast to FIG. 1, however, the embodiment of FIG. 3 provides a non-uniform scale factor s (the slope of the mapping function $z'=f_2(z)$ for the second branch 202 of the multiple-valued coordinate transformation); indeed, the scale factor in this relation satisfies, in some interval(s), the relation $-1<s<0$ (corresponding to a local spatial contraction and coordinate inversion), and in other interval(s), the relation $s<-1$ (corresponding to a local spatial dilation and coordinate inversion). The constitutive relations are again given by equations (5), where s is variable in the axial direction, and the transformation medium is a non-uniform uniaxial medium (again with negative constitutive parameters and defining a negative index of refraction).

More generally, embodiments of a negatively-refractive focusing structure, operable to provide an interior focusing region for electromagnetic energy that radiates from an exterior field region, may comprise a transformation medium, the transformation medium corresponding to a multiple-valued coordinate transformation that maps an untransformed region to the exterior field region, and further maps the untransformed region to the interior focusing region; and the constitutive relations of this transformation medium may be implemented with an artificially-structured material (such as a metamaterial), as described previously. In some embodiments, the coordinate transformation includes a coordinate inversion and spatial contraction along an axial direction of the interior focusing region, and a scale factor of the spatial contraction (within the interior focusing region) may correspond to a ratio of an axial extent of the interior focusing region to an axial extent of the exterior field region. This is consistent with FIGS. 2 and 4, where the slope triangle 200, indicating a scale factor in the interior focusing region, is similar or substantially similar to a triangle with a base 220 (equal to 130, for a first branch 201 that is an identity transformation) and a height 120. Just as the axial direction can vary along a transverse extent of the interior focusing region, the direction of the coordinate inversion/contraction can vary as well. Thus, for example, a substantially cylindrically- or spherically-curved interior focusing region may correspond to a (uniform or non-uniform) inversion/contraction of a cylindrical or spherical radius coordinate; a substantially ellipsoidally-curved interior focusing region may correspond to a (uniform or non-uniform) inversion/contraction of a confocal ellipsoidal coordinate; etc.

Figure 5:
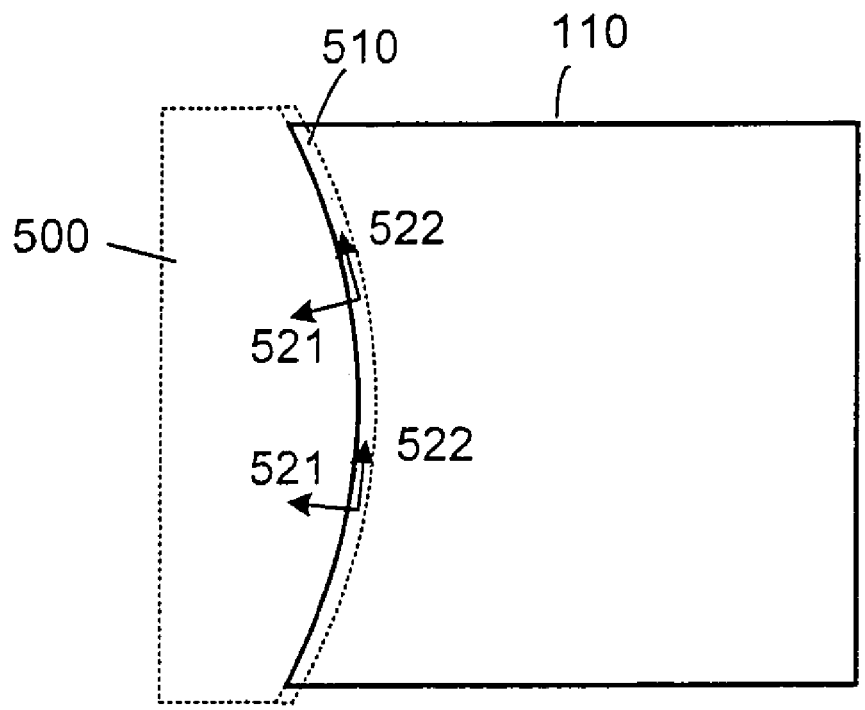
FIG. 5 depicts a negatively-refractive focusing structure with an input surface region.

The negatively-refractive focusing structure 110 is depicted in FIGS. 1 and 3 as a planar slab, but this is a schematic illustration and is not intended to be limiting. In various embodiments the negatively-refractive focusing structure can be a cylindrically-, spherically-, or ellipsoidally-curved slab, or any other slab- or non-slab-like structure configured to provide an interior focusing region for negatively-refracted electromagnetic energy with an axial magnification substantially less than one. Some embodiments, such as that depicted in FIG. 5, define an input surface region 510 as a surface region of the negatively-refractive focusing structure 110 that receives electromagnetic radiation from an adjacent region 500, and this input surface region may be substantially nonreflective of the received electromagnetic radiation. For example, where the negatively-refractive focusing structure is a transformation medium, equations (1) and (2) generally provide a medium that is substantially nonreflective. More generally, the input surface region may be substantially nonreflective by virtue of a substantial impedance-matching to the adjacent region. With impedance-matching, a wave impedance of the input surface region is substantially equal to a wave impedance of the adjacent region. The wave impedance of an isotropic medium is $$Z_0 = \sqrt{\frac{\mu}{\varepsilon}} \quad (6)$$

while the wave impedance of a generally anisotropic medium is a tensor quantity, e.g. as defined in L. M. Barkovskii and G. N. Borzdov, "The impedance tensor for electromagnetic waves in anisotropic media," J. Appl. Spect. 20, 836 (1974) (herein incorporated by reference). In some embodiments an impedance-matching is a substantial matching of every matrix element of the wave impedance tensor (i.e. to provide a substantially nonreflective interface for all incident polarizations); in other embodiments an impedance-matching is a substantial matching of only selected matrix elements of the wave impedance tensor (e.g. to provide a substantially nonreflective interface for a selected polarization only). In some embodiments, the adjacent region defines a permittivity $\varepsilon_1$ and a permeability $\mu_1$, where either or both parameters may be substantially unity or substantially non-unity; the input surface region defines a permittivity $\varepsilon_2$ and a permeability $\mu_2$, where either or both parameters may be substantially unity or substantially non-unity; and the impedance-matching condition implies $$\frac{\varepsilon_2}{\varepsilon_1} \cong \frac{\mu_2}{\mu_1} \quad (7)$$

where $\varepsilon_2$ and $\mu_2$ may be tensor quantities. Defining a surface normal direction and a surface parallel direction (e.g. depicted as elements 521 and 522, respectively, in FIG. 5), some embodiments provide a input surface region that defines: a surface normal permittivity $\varepsilon_2^\perp$ corresponding to the surface normal direction and a surface parallel permittivity $\varepsilon_2^\parallel$ corresponding to the surface parallel direction; and/or a surface normal permeability $\mu_2^\perp$ corresponding to the surface normal direction and a surface parallel permeability $\mu_2^\parallel$ corresponding to the surface parallel direction; and the impedance-matching condition may imply (in addition to equation (7)) one or both of the following conditions:

$$\frac{\varepsilon_2^\perp}{\varepsilon_1} \cong \frac{\varepsilon_1}{\varepsilon_2^\parallel}, \frac{\mu_2^\perp}{\mu_1} \cong \frac{\mu_1}{\mu_2^\parallel}. \quad (8)$$

Where the input surface region is a curved surface region (e.g. as in FIG. 5), the surface normal direction and the surface parallel direction can vary with position along the input surface region.

Some embodiments provide one or more electromagnetic sensors positioned within the interior focusing region of the negatively-refractive focusing structure. In general, electromagnetic sensors, such as those depicted FIG. 1 and in other embodiments, are electromagnetic devices having a detectable response to received or absorbed electromagnetic energy. Electromagnetic sensors can include antennas (such as wire/loop antennas, horn antennas, reflector antennas, patch antennas, phased array antennas, etc.), solid-state photodetectors (such as photodiodes, CCDs, and photoresistors), vacuum photodetectors (such as phototubes and photomultipliers) chemical photodetectors (such as photographic emulsions), cryogenic photodetectors (such as bolometers), photoluminescent detectors (such as phosphor powders or fluorescent dyes/markers), MEMS detectors (such as microcantilever arrays with electromagnetically responsive materials or elements) or any other devices operable to detect and/or transduce electromagnetic energy. In some embodiments the electromagnetic sensors include devices or materials that may undergo a change in state (such as a phase change or chemical reaction) in response to absorbed or received electromagnetic energy, e.g. a photoresist, a light-sensitive polymer, etc. In other embodiments the electromagnetic sensors include devices or materials having a nonlinear response to absorbed or received electromagnetic radiation, e.g. a nonlinear optical material. Some embodiments include a plurality of electromagnetic sensors positioned within the interior focusing region. A first example is a multiplet of sensors operable at a corresponding multiplet of wavelengths or wavelength bands, i.e. a first sensor operable at a first wavelength/wavelength band, a second sensor operable at a second wavelength/wavelength band, etc. A second example is a focal plane array of sensors or sensor multiplets (e.g. a Bayer or Foveon sensor). A third example is a phased array of antennas. The plurality of sensors can be axially distributed (as in FIG. 1); for example, the axial extent of the interior focusing region may admit a plurality of parallel focal plane sensor arrays.

In some embodiments the negatively-refractive focusing structure provides an interior focusing region with an axial magnification substantially less than one for electromagnetic energy at a selected frequency/frequency band and/or a selected polarization. The selected frequency or frequency band may be selected from a range that includes radio frequencies, microwave frequencies, millimeter- or submillimeter-wave frequencies, THz-wave frequencies, optical frequencies (e.g. variously corresponding to soft x-rays, extreme ultraviolet, ultraviolet, visible, near-infrared, infrared, or far infrared light), etc. The selected polarization may be a particular TE polarization (e.g. where the electric field is in a particular direction transverse to the axial direction, as with s-polarized electromagnetic energy), a particular TM polarization (e.g. where the magnetic field is in a particular direction transverse to the axial direction, as with p-polarized electromagnetic energy), a circular polarization, etc. (other embodiments provide an interior focusing region with an axial magnification substantially less than one that is substantially the same interior focusing region with substantially the same axial magnification for any polarization of electromagnetic energy, e.g. for unpolarized electromagnetic energy).

In other embodiments the negatively-refractive focusing structure provides a first interior focusing region with a first axial magnification substantially less than one for electromagnetic energy at a first frequency, and a second interior focusing region with a second axial magnification substantially less than one for electromagnetic energy at a second frequency. The first axial magnification may be different than or substantially equal to the first axial magnification, and the first and second interior focusing regions may be substantially (or completely) non-overlapping, partially overlapping or substantially (or completely) overlapping. For embodiments that recite first and second frequencies, the first and second frequencies may be selected from the frequency categories in the preceding paragraph. Moreover, for these embodiments, the recitation of first and second frequencies may generally be replaced by a recitation of first and second frequency bands, again selected from the above frequency categories. These embodiments providing a negatively-refractive focusing structure operable at first and second frequencies may include a transformation medium having an adjustable response to electromagnetic radiation. For example, the transformation medium may have a response to electromagnetic radiation that is adjustable (e.g. in response to an external input or control signal) between a first response and a second response, the first response providing the first interior focusing region for electromagnetic energy at the first frequency, and the second response providing the second interior focusing region for electromagnetic energy at the second frequency. A transformation medium with an adjustable electromagnetic response may be implemented with variable metamaterials, e.g. as described in R. A. Hyde et al, supra. Other embodiments of a negatively-refractive focusing structure operable at first and second frequencies may include transformation medium having a frequency-dependent response to electromagnetic radiation, corresponding to frequency-dependent constitutive parameters. For example, the frequency-dependent response at a first frequency may provide a first interior focusing region for electromagnetic energy at the first frequency, and the frequency-dependent response at a second frequency may provide second interior focusing region for electromagnetic energy at the second frequency. A transformation medium having a frequency-dependent response to electromagnetic radiation can be implemented with artificially-structured materials such as metamaterials; for example, a first set of metamaterial elements having a response at the first frequency may be interleaved with a second set of metamaterial elements having a response at the second frequency.

Figure 6:
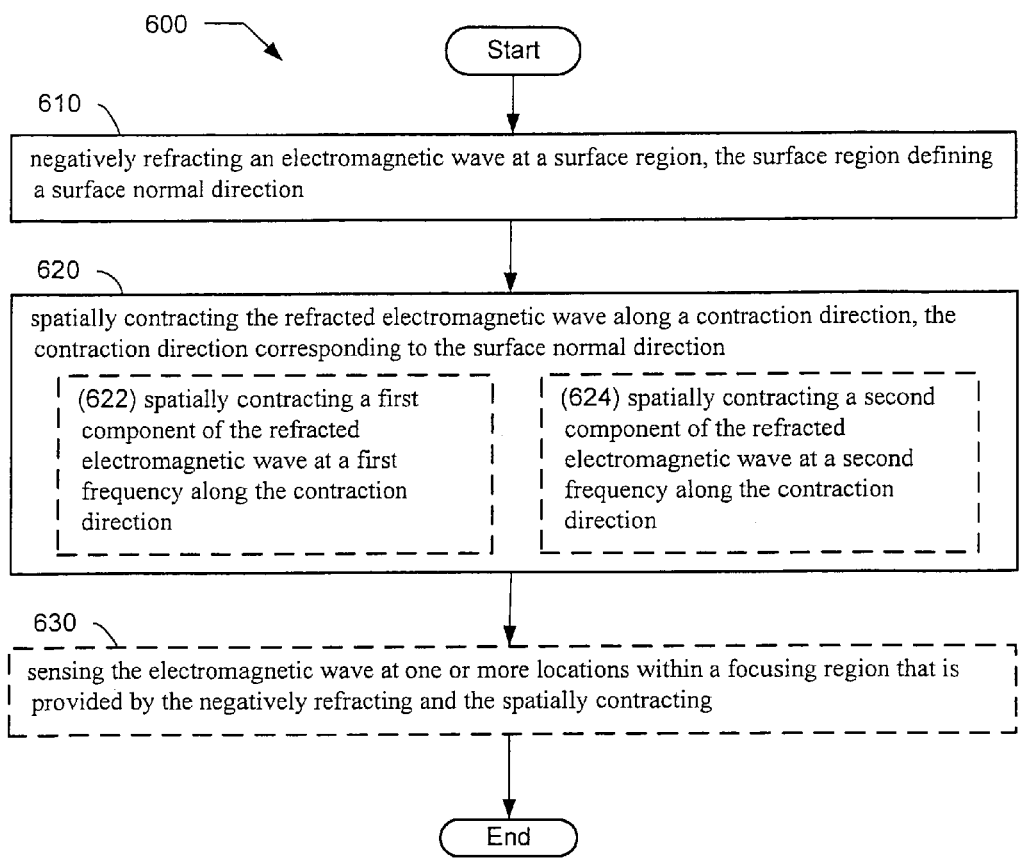
FIG. 6 depicts a first process flow.

An illustrative embodiment is depicted as a process flow diagram in FIG. 6. Flow 600 includes operation 610—negatively refracting an electromagnetic wave at a surface region, the surface region defining a surface normal direction. For example, a negatively-refractive focusing structure, such as that depicted as element 110 in FIG. 5, may include an input surface region 510 that negatively refracts electromagnetic energy incident upon the input surface region from an adjacent region, and the negatively-refractive focusing structure may include a transformation medium that provides a coordinate inversion (for a coordinate corresponding to a direction normal to the surface, e.g. the direction 521 in FIG. 5), the coordinate inversion corresponding to a negatively-refractive response of the transformation medium. Flow 600 further includes operation 620—spatially contracting the refracted electromagnetic wave along a contraction direction, the contraction direction corresponding to the surface normal direction. For example, a negatively-refractive focusing structure, such as that depicted as element 110 in FIGS. 1 and 3, may spatially contract refracted electromagnetic energy 102 along an axial direction (e.g. the direction 160 in FIGS. 1 and 3) to provide an axial extent of an interior focusing region 120 less than an axial extent of an exterior field region 130 (the ratio of axial extents corresponding to a provided axial magnification), and the negatively-refractive focusing structure may include a transformation medium that provides a coordinate contraction (for an axial coordinate corresponding to the axial direction 160), the coordinate contraction having a scale factor corresponding to the provided axial magnification. Operation 620 optionally includes sub-operation 622—spatially contracting a first component of the refracted electromagnetic wave at a first frequency along the contraction direction—and sub-operation 624—spatially contracting a second component of the refracted electromagnetic wave at a second frequency along the contraction direction. For example, a negatively-refractive focusing structure may provide a first interior focusing region with a first axial magnification for electromagnetic energy at a first frequency and a second interior focusing region with a second axial magnification for electromagnetic energy at a second frequency, where the second axial magnification may be different than or substantially equal to the first axial magnification; and this negatively-refractive focusing structure operable at first and second frequencies may include a transformation medium having an adjustable response to electromagnetic radiation, or a transformation medium having a frequency-dependent response to electromagnetic radiation. Flow 600 optionally includes operation 630—sensing the electromagnetic wave at one or more locations within a focusing region that is provided by the negatively refracting and the spatially contracting. For example, a negatively-refractive focusing structure 110, such as that depicted in FIGS. 1 and 3, may provide an interior focusing region 120, and one or more electromagnetic sensors, such as those depicted as elements 150 in FIG. 1, may be positioned within the interior focusing region to detect/receive/absorb the electromagnetic energy 102.

Figure 7:
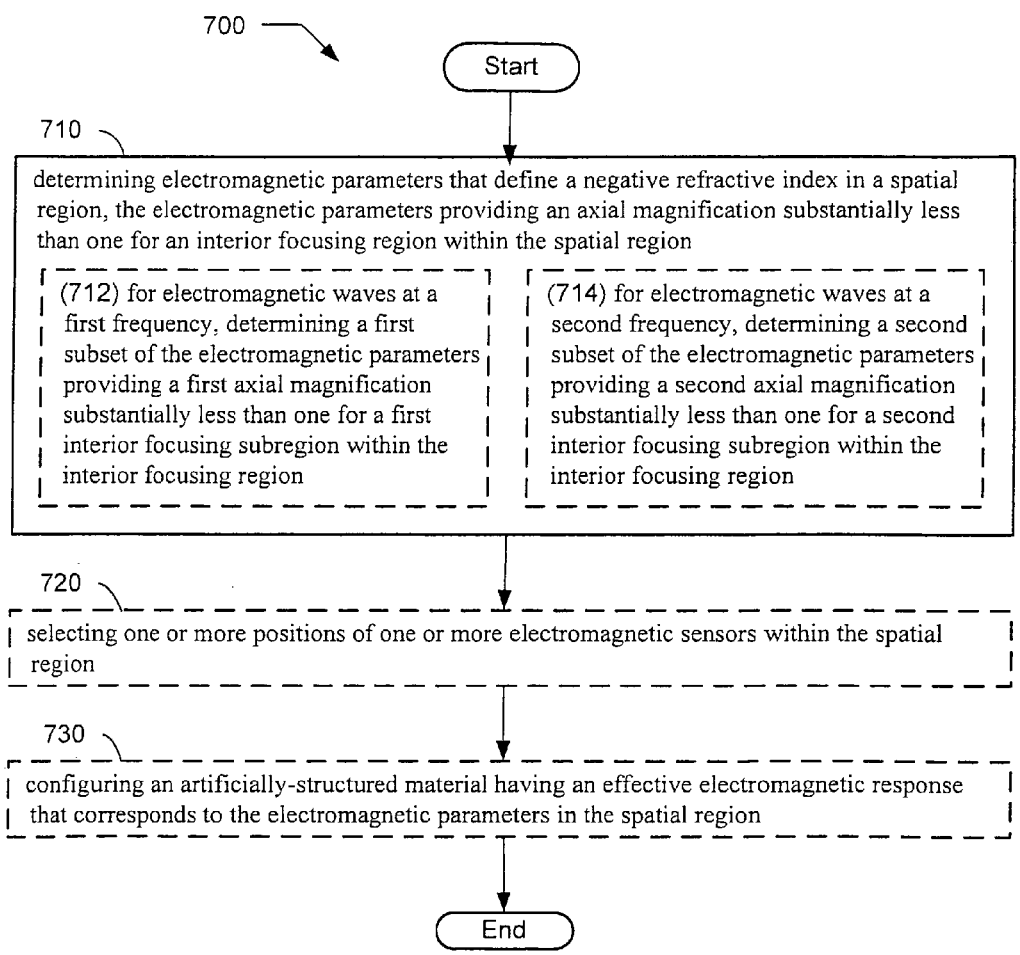
FIG. 7 depicts a second process flow.

Another illustrative embodiment is depicted as a process flow diagram in FIG. 7. Flow 700 includes operation 710—determining electromagnetic parameters that define a negative refractive index in a spatial region, the electromagnetic parameters providing an axial magnification substantially less than one for an interior focusing region within the spatial region. For example, the spatial region may be a volume that encloses a negatively-refractive focusing structure, such as that depicted as element 110 in FIGS. 1 and 3, and the determined electromagnetic parameters may be the electromagnetic parameters of the negatively-refractive focusing structure. The negatively-refractive focusing structure may include a transformation medium, where the determined electromagnetic parameters satisfy or substantially satisfy equations (1) and (2), as described above; or, the determined electromagnetic parameters may be reduced parameters (as discussed earlier) where the corresponding non-reduced parameters satisfy equations (1) and (2). In some embodiments, the determining of the electromagnetic parameters includes: determining a coordinate transformation (such as those depicted in FIGS. 2 and 4); then determining electromagnetic parameters for a corresponding transformation medium (e.g. with equations (1) and (2)); then, optionally, reducing the electromagnetic parameters (e.g. to at least partially substitute a magnetic response for an electromagnetic response, or vice versa, as discussed above). Operation 710 optionally includes sub-operation 712—for electromagnetic waves at a first frequency, determining a first subset of the electromagnetic parameters providing a first axial magnification substantially less than one for a first interior focusing subregion within the interior focusing region—and sub-operation 714—for electromagnetic waves at a second frequency, determining a second subset of the electromagnetic parameters providing a second axial magnification substantially less than one for a second interior focusing subregion within the interior focusing region. For example, the determined electromagnetic parameters may be the electromagnetic parameters of a negatively-refractive focusing structure providing a first interior focusing region with a first axial magnification for electromagnetic energy at a first frequency and a second interior focusing region with a second axial magnification for electromagnetic energy at a second frequency. The negatively-refractive focusing structure may include a transformation medium having an adjustable response to electromagnetic radiation, e.g. adjustable between a first response, corresponding to the first subset of the electromagnetic parameters, and a second response, corresponding to the second subset of the electromagnetic parameters. Or, the negatively-refractive focusing structure may include a transformation medium having a frequency-dependent response to electromagnetic radiation, corresponding to frequency-dependent constitutive parameters, so that the first and second subsets of the electromagnetic parameters are values of the frequency-dependent constitutive parameters at the first and second frequencies, respectively. Flow 700 optionally further includes operation 720—selecting one or more positions of one or more electromagnetic sensors within the spatial region. For example, electromagnetic sensors may be positioned in a phased array, an focal plane array, an axially-distributed arrangement, etc. Flow 700 optionally further includes operation 730—configuring an artificially-structured material having an effective electromagnetic response that corresponds to the electromagnetic parameters in the spatial region. For example, the configuring may include configuring the structure(s) and/or the materials that compose a photonic crystal or a metamaterial. Operation 730 optionally includes determining an arrangement of a plurality of electromagnetically responsive elements having a plurality of individual responses, the plurality of individual responses composing the effective electromagnetic response. For example, the determining may include determining the positions, orientations, and individual response parameters (spatial dimensions, resonant frequencies, linewidths, etc.) of a plurality of metamaterial elements such as split-ring resonators, wire or nanowire pairs, etc. Operation 730 optionally includes configuring at least one electromagnetically-responsive structure to arrange a plurality of distributed electromagnetic responses, the plurality of distributed electromagnetic responses composing the effective electromagnetic response. For example, the configuring may include configuring the distribution of loads and interconnections on a transmission line network, configuring an arrangement of layers in a layered metamaterial, configuring a pattern of etching or deposition (as with a nano-fishnet structure), etc.

Figure 8:
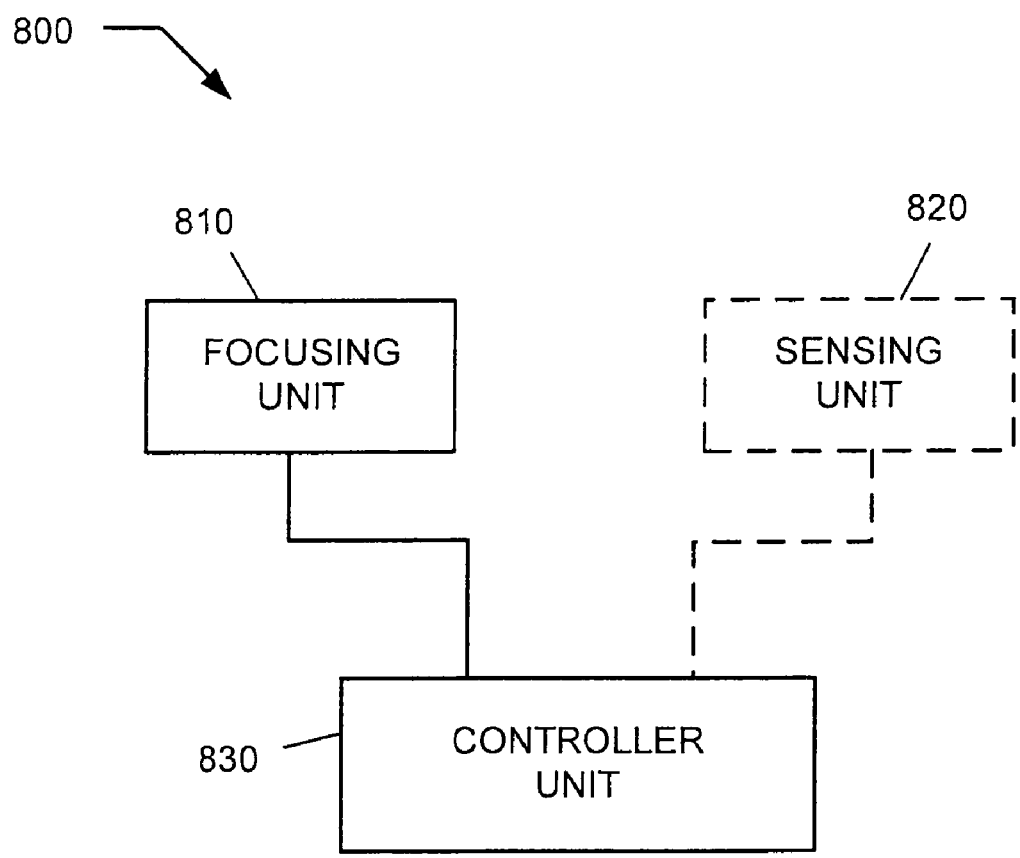
FIG. 8 depicts a system that includes a focusing unit and a controller.

With reference now to FIG. 8, an illustrative embodiment is depicted as a system block diagram. The system 800 includes a focusing unit 810 optionally coupled to a controller unit 830. The focusing unit 810 may include a negatively-refractive focusing structure such as that depicted as element 110 in FIGS. 1 and 3. The negatively-refractive focusing structure may be a variable negatively-refractive focusing structure, such as a variable metamaterial responsive to one or more control inputs to vary one or more focusing characteristics (axial magnification, operating frequency/frequency band, operating polarization, effective coordinate transformation for a transformation medium, etc.); and the controller unit 830 may include control circuitry that provides one or more control inputs to the variable negatively-refractive focusing structure. The system 800 optionally further includes a sensing unit 820 that may include one or more sensors, such as those depicted as elements 150 in FIG. 1, and associated circuitry such as receiver circuitry, detector circuitry, and/or signal processing circuitry. The sensing unit 820 is optionally coupled to the controller unit 830, and in some embodiments the controller unit 830 includes circuitry for coordinating or synchronizing the operation of the focusing unit 810 and the sensing unit 820. The controller unit 830 may include circuitry responsive to sensor data (from the sensor unit 820) to vary the focusing characteristics of the focusing structure. As a first example, the controller unit may include circuitry responsive to the sensor data to identify a frequency/polarization of received energy, and adjust the focusing unit to an operating frequency/polarization substantially equal to the frequency/polarization of the received energy. As a second example, the controller unit may include circuitry responsive to the sensor data to identify a target interior focusing region (and/or a target axial magnification), and corresponding adjust the focusing system whereby a negatively-refractive focusing structure provides an interior focusing region substantially equal to the target interior focusing region (and/or an axial magnification substantially equal to the target axial magnification).

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

One skilled in the art will recognize that the herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
   determining electromagnetic parameters that define a negative refractive index in a spatial region, the electromagnetic parameters providing an axial magnification substantially less than one for an interior focusing region within the spatial region;
   selecting one or more positions of one or more electromagnetic sensors within the spatial region; and
   configuring an artificially-structured material having an effective electromagnetic response that corresponds to the electromagnetic parameters in the spatial region.

2. The method of claim 1, wherein the negative refractive index is less than minus one within at least a portion of the spatial region.

3. The method of claim 1, wherein the negative refractive index is less than minus one within at least a portion of the interior focusing region.

4. The method of claim 1, wherein the one or more positions are inside the interior focusing region.

5. The method of claim 1, wherein the electromagnetic parameters provide the interior focusing region for electromagnetic waves that radiate from an exterior field region.

6. The method of claim 5, wherein the axial magnification corresponds to a ratio of an axial extent of the interior focusing region to an axial extent of the exterior field region.

7. The method of claim 5, wherein the electromagnetic parameters define a transformation medium.

8. The method of claim 7, wherein the transformation medium corresponds to a multiple-valued coordinate transformation.

9. The method of claim 8, wherein a first branch of the multiple-valued coordinate transformation maps an untransformed region to the exterior field region, and a second branch of the multiple-valued coordinate transformation maps the untransformed region to the interior focusing region.

10. The method of claim 9, wherein the first branch of the multiple-valued coordinate transformation is an identity transformation.

11. The method of claim 9, wherein the second branch of the multiple-valued coordinate transformation includes an axial coordinate inversion.

12. The method of claim 11, wherein the second branch of the multiple-valued coordinate transformation includes an axial coordinate contraction.

13. The method of claim 12, wherein the axial magnification corresponds to a scale factor of the axial coordinate contraction.

14. The method of claim 1, wherein the electromagnetic parameters include:
   axial electromagnetic parameters; and
   transverse electromagnetic parameters that inversely correspond to the axial electromagnetic parameters.

15. The method of claim 14, wherein the interior focusing region defines an axial direction, and the axial electromagnetic parameters correspond to the axial direction.

16. The method of claim 15, wherein the transverse electromagnetic parameters correspond to a transverse direction, the transverse direction being substantially perpendicular to the axial direction.

17. The method of claim 14, wherein the axial electromagnetic parameters include an axial permittivity.

18. The method of claim 17, wherein the transverse electromagnetic parameters include a transverse permittivity that is substantially a multiplicative inverse of the axial permittivity.

19. The method of claim 18, wherein the axial permittivity is less than zero and greater than minus one.

20. The method of claim 17, wherein the axial electromagnetic parameters include an axial permeability.

21. The method of claim 20, wherein the transverse electromagnetic parameters include a transverse permeability that is substantially a multiplicative inverse of the axial permeability.

22. The method of claim 21, wherein the axial permeability is less than zero and greater than minus one.

23. The method of claim 20, wherein the axial permittivity is substantially equal to the axial permeability.

24. The method of claim 23, wherein the transverse electromagnetic parameters include a transverse permeability that is substantially a multiplicative inverse of the axial permeability.

25. The method of claim 24, wherein the axial permeability is less than zero and greater than minus one.

26. The method of claim 1, wherein the spatial region includes an input surface region that is substantially nonreflective of electromagnetic energy incident upon the input surface region.

27. The method of claim 26, wherein the input surface region is substantially nonreflective of electromagnetic energy incident upon the input surface region from an adjacent region, the adjacent region being exterior to the spatial region.

28. The method of claim 27, wherein a wave impedance of the adjacent region is substantially equal to a wave impedance of the input surface region.

29. The method of claim 28, wherein the adjacent region defines a first permittivity and a first permeability, the input surface region defines a second permittivity and a second permeability, and a ratio of the second permittivity to the first permittivity is substantially equal to a ratio of the second permeability to the first permeability.

30. The method of claim 29, wherein the second permittivity is less than zero.

31. The method of claim 29, wherein the second permeability is less than zero.

32. The method of claim 31, wherein the second permittivity is less than zero.

33. The method of claim 29, wherein the input surface region defines a surface normal direction and a surface parallel direction, the second permittivity includes a surface normal permittivity corresponding to the surface normal direction and a surface parallel permittivity corresponding to the surface parallel direction, and a ratio of the surface normal permittivity to the first permittivity is substantially a multiplicative inverse of a ratio of the surface parallel permittivity to the first permittivity.

34. The method of claim 33, wherein the ratio of the surface normal permittivity to the first permittivity is less than zero and greater than minus one.

35. The method of claim 33, wherein the second permeability includes a surface normal permeability corresponding to the surface normal direction and a surface parallel permeability corresponding to the surface parallel direction, and a ratio of the surface normal permeability to the first permeability is substantially a multiplicative inverse of a ratio of the surface parallel permeability to the first permeability.

36. The electromagnetic apparatus of claim 35, wherein the ratio of the surface normal permittivity to the first permittivity is less than zero and greater than minus one.

37. The method of claim 1, wherein the artificially-structured material includes a photonic crystal.

38. The method of claim 1, wherein the artificially-structured material includes a metamaterial.

39. The method of claim 1, wherein the configuring includes: determining an arrangement of a plurality of electromagnetically responsive elements having a plurality of individual responses, the plurality of individual responses composing the effective electromagnetic response.

40. The method of claim 39, wherein the plurality of individual responses includes a plurality of individual frequency responses.

41. The method of claim 40, wherein the plurality of individual frequency responses is a plurality of individual frequency bandwidth responses corresponding to a plurality of individual bandwidths.

42. The method of claim 41, wherein the plurality of electromagnetically responsive elements is a plurality of electromagnetically responsive resonators corresponding to a plurality of resonant frequencies, and each of the individual bandwidths is substantially centered around a corresponding one of the resonant frequencies.

43. The method of claim 41, wherein the individual bandwidths are at least partially overlapping.

44. The method of claim 39, wherein the electromagnetically responsive elements include discrete circuit elements.

45. The method of claim 39, wherein the electromagnetically responsive elements include integrated circuit elements.

46. The method of claim 39, wherein the electromagnetically responsive elements include metallic structures.

47. The method of claim 39, wherein the electromagnetically responsive elements include LC resonators.

48. The method of claim 39, wherein the electromagnetically responsive elements include plasmonic resonators.

49. The method of claim 39, wherein the electromagnetically responsive elements include nanostructures.

50. The method of claim 39, wherein the electromagnetically responsive elements include split-ring resonators.

51. The method of claim 1, wherein the configuring includes: configuring at least one electromagnetically-responsive structure to arrange a plurality of distributed electromagnetic responses, the plurality of distributed electromagnetic responses composing the effective electromagnetic response.

52. The method of claim 51, wherein the distributed electromagnetic responses include distributed inductive-capacitive responses.

53. The method of claim 51, wherein the at least one electromagnetically-responsive structure includes transmission lines.

\* \* \* \* \*